US 11,754,239 B2
Sep. 12, 2023

(12) United States Patent
Osborne

(10) Patent No.: US 11,754,239 B2
(45) Date of Patent: Sep. 12, 2023

(54) APPARATUS FOR A SOLAR LIGHT

(71) Applicant: Gary Thomas Osborne, Indianapolis, IN (US)

(72) Inventor: Gary Thomas Osborne, Indianapolis, IN (US)

( * ) Notice: Subject to any disclaimer, the term of this patent is extended or adjusted under 35 U.S.C. 154(b) by 122 days.

(21) Appl. No.: 17/227,634

(22) Filed: Apr. 12, 2021

(65) Prior Publication Data

US 2022/0325860 A1   Oct. 13, 2022

(51) Int. Cl.
*H05B 47/105* (2020.01)
*H02J 7/00* (2006.01)
*F21S 9/03* (2006.01)
*F21V 23/04* (2006.01)

(52) U.S. Cl.
CPC ............ *F21S 9/03* (2013.01); *F21V 23/0464* (2013.01); *H02J 7/007182* (2020.01); *H05B 47/105* (2020.01); *H02J 2300/24* (2020.01)

(58) Field of Classification Search
CPC .... F21S 9/03; F21S 9/035; F21S 9/032; H02J 7/007182; H02J 2300/24; H02J 7/35; H02J 7/345; H02J 9/065; H05B 47/105; H05B 47/165; H05B 47/11; H05B 47/10; H05B 47/16; H05B 45/30; H05B 45/37; F21V 23/0464
See application file for complete search history.

(56) References Cited

U.S. PATENT DOCUMENTS

| | | | |
|---|---|---|---|
| 4,410,930 A | 10/1983 | Yachabach | |
| 5,055,984 A | 10/1991 | Hung et al. | |
| 5,117,324 A | 5/1992 | Johnson | |
| 6,013,985 A | 1/2000 | Green et al. | |
| 6,120,165 A | 9/2000 | Shalvi | |
| 6,184,649 B1 | 2/2001 | Philipot | |
| 6,291,764 B1 | 9/2001 | Ishida et al. | |
| 6,573,659 B2 | 6/2003 | Toma et al. | |
| 7,851,737 B2 | 12/2010 | Crouse et al. | |
| 7,999,484 B2 | 8/2011 | Jurngwirth et al. | |
| 8,098,017 B2 | 1/2012 | Chidester | |

(Continued)

FOREIGN PATENT DOCUMENTS

CN   201787473 U   4/2011
CN   202385351 U   8/2012

(Continued)

OTHER PUBLICATIONS

Additional Information of the Disclosure, compiled and edited by Gary Osborne, not published.

(Continued)

*Primary Examiner* — Alexander H Taningco
*Assistant Examiner* — Haissa Philogene

(57) ABSTRACT

An apparatus includes a light unit and a controller for providing a controlled humanly visible illumination. A solar converter unit and an energy storage device supply an energy output to enable the light unit to provide the controlled illumination. The solar converter unit is configured to charge the energy storage device during a substantial shade charging condition. The controller includes a processor coupled to manage the controlled illumination, a memory accessible to the processor, and a program stored in the memory for execution by the processor to manage the controlled illumination.

20 Claims, 3 Drawing Sheets

(56) References Cited

U.S. PATENT DOCUMENTS

| | | | |
|---|---|---|---|
| 8,174,408 B2 | 5/2012 | Johnston et al. | |
| 8,193,758 B2 | 6/2012 | Lipcsei | |
| 8,222,584 B2 | 7/2012 | Rains, Jr. et al. | |
| 8,779,625 B2 | 7/2014 | Work et al. | |
| 8,810,191 B2 | 8/2014 | Maldonado | |
| 9,253,847 B2 | 2/2016 | Zhai et al. | |
| 9,494,297 B1 | 11/2016 | Nagengast et al. | |
| 9,699,869 B2 | 7/2017 | Holland et al. | |
| 9,728,978 B2 | 8/2017 | Dibachi et al. | |
| 9,885,789 B2 | 2/2018 | Pighin et al. | |
| 10,847,992 B2 | 11/2020 | Osborne | |
| 10,978,989 B1* | 4/2021 | Jakobsen | B60L 50/60 |
| 11,231,152 B1* | 1/2022 | Thompson | G02B 19/0009 |
| 2006/0120068 A1 | 6/2006 | Langlois et al. | |
| 2008/0169784 A1* | 7/2008 | Chung | H02J 7/35 320/101 |
| 2012/0020060 A1* | 1/2012 | Myer | F21V 29/71 362/183 |
| 2012/0206050 A1* | 8/2012 | Spero | B60Q 1/1423 315/152 |
| 2018/0337552 A1* | 11/2018 | Osborne | H02J 7/0031 |
| 2019/0259108 A1* | 8/2019 | Bongartz | A01G 7/045 |
| 2021/0126573 A1* | 4/2021 | Jakobsen | F16M 11/2021 |

FOREIGN PATENT DOCUMENTS

| | | |
|---|---|---|
| KR | 101406093 B1 | 6/2014 |
| KR | 20160086588 A | 7/2016 |

OTHER PUBLICATIONS

ATtiny212/412 Datasheet, Microcontroller with Core Independent Peripherals, 2017, published by Microchip Technology Inc.
Auto-Dimming-Solar-Street-Light, Wireless Monitoring System For Solar Street Light, Nov. 27, 2015, Solar Light Manufacturer Sunmaster.
Battery Efficiency, Physical models used > Batteries—General model description, 1994-2020, https://www.pvsyst.com/help/.
Gary Osborne, A Solar Light with Three Batteries in Series, Jan. 18, 2021, not published.
Converting Farads to mAh, ivoras' electronics stuff, Adventures in electronics, https://ivoras-electronics.tumblr.com/.
3030 LEDs, Cree, Inc., 2017-2018, Cree Venture LED Company Limited.
I/O Multiplexing Introduction, Application Note, Oct. 1, 2016, Atmel.
Joshua Israelsohn, What is the MOSFET body diode?, Dec. 15, 2016, https://www.powerelectranictips.com/remember-mosfet-body-diode-faq/.
Ni—MH Open Circuit Voltage vs State of Charge, AA Cycler, Sep. 23, 2017, http://aacycler.com/post/nimh-open-circuit-voltage-vs-state-of-charge/.
Robert Keim, Introduction to Photodiodes: The Nature of Light and pn Junctions, Dec. 16, 2020, https://www.allaboutcircuits.com/technical-articles/introduction-to-photodiodes-the-nature-of-light-and-pn-junctions/.
Photo resistor, Chapter 3—Resistor types, https://eepower.com/resistor-guide/resistor-types/photoresistor/#:~text=Photo%20resistors%2C%20also%20known%20as,to%20measure%20the%20light%20intensity.
Robert Keim, Introduction to Phototransistors, Jan. 26, 2021, https://www.allaboutcircuits.com/technical-articles/introduction-to-phototransistors/.
Jordandee, Pulse Width Modulation PWM, Sparkfun, https://learn.sparkfun.com/tutorials/pulse-width-modulation/duty-cycle.
Gary Osborne, Where to Use Shade Solar Lights, 2017, https://shade-solar-lights.com/where-to-use.
YX601 IC Datasheet, Shiningic.
YX601 IC Datasheet, 8 Pages, May 1, 2015.
Product description, YX601 boost DC-DC constant current LED driver chip ICLED driver lighting, Shenzhen Jingli-Hongtai Electronic Technology Co., Ltd., http://www.chipli.cn/2016/light-driver_1025/71.html.
English translation of foreign patent CN201787473U, Google Patents.
English translation of foreign patent CN202385351U, Google Patents.
English translation of foreign patent KR101406093B1, Google Patents.
English translation of foreign patent KR20160086588A, Google Patents.

* cited by examiner

APPARATUS FOR A SOLAR LIGHT

CROSS-REFERENCE TO RELATED APPLICATIONS

Not applicable.

RELATED CO-PENDING U.S. PATENT APPLICATIONS

Not applicable.

COPYRIGHT NOTICE

Not applicable.

BACKGROUND OF THE RELEVANT PRIOR ART

One or more embodiments of the present invention generally relate to solar lights. More particularly, embodiments of the present invention relate to solar lights having a controller for adjusting humanly visible illumination. The controller may include a processor, a memory, and a program (firmware) stored in the memory for execution by the processor.

There are various solar devices having a controller for controlling the illumination. These prior-art controlled-illumination devices have distinct properties and problems. One problem is ineffectiveness when operated in areas having substantial shade. The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is U.S. Pat. No. 4,410,930 to Yachabach describing an outdoor telephone booth with a PV panel 130 and lamp control circuitry 134. It also includes a sensing unit 36 located on the under or shadow side of the booth to avoid sensing the light from lamp 21 and hence only operates according to ambient natural light.

Another example is U.S. Pat. No. 6,573,659 to Toma et al. describing a solar powered light with automatic light control. It has a light unit that permits automatic adjustment of its output to adapt to its solar environment. The main purpose is to keep the light output at a 100 percent level as much as possible. The FIG. 5 shows normal operation over three days.

Another example is U.S. Pat. No. 7,999,484 to Jurngwirth et al. describing a light having a voltage converter to power a string of one or more LEDs, a current sensing means to generate a feedback signal indicative of current flowing through the string, and a feedback means to receive the feedback signal and generate a control signal for the voltage converter.

Another example is U.S. Pat. No. 8,193,758 to Lipcsei describing a power conversion circuit for charging a battery from a solar panel and for delivering power to some LEDs. It includes a controller to maintain an output voltage of the solar panel at a threshold voltage while charging the battery. The controller reduces an output current of the solar panel if ambient light decreases, and it increases the output current if the ambient light increases.

Another example is U.S. Pat. No. 8,222,584 to Rains et al. describing a lighting system for humanly visible light illumination which includes light fixture, a controller, and a communication interface to transmit information through a communications network.

Another example is U.S. Pat. No. 8,779,625 to Work et al. describing an adaptive solar powered system having a DC/DC converter coupled between a battery and a solar panel. It includes logic for controlling the DC/DC converter to operate near the maximum power point of the solar panel.

Another example is U.S. Pat. No. 9,253,847 to Zhai et al. describing a lighting an adaptive controlled outdoor lighting system having a controller configured to obtain weather forecast information to determine lighting settings.

Another example is U.S. Pat. No. 9,728,978 to Dibachi et al. describing a method of using received power to charge a battery, applying power from the battery to power multiple loads, and monitoring power consumed by the loads. It includes one or more control systems for reducing power to selected loads as a function of a predetermined priority for each load, power received, and available battery power. FIG. 9 is a graph illustrating a modified lighting profile showing watts provided as a function of time of day.

Another example is U.S. Pat. No. 10,847,992 to Osborne describing shade categories and a category numbering system.

Another example is website shade-solar-lights.com which offers solar lights for sale that are configured for operating "in shade or sun". An included webpage describes where to use these solar lights. It states, "each light has a number indicating the type of shade where it can be used. The higher the number the dimmer the shade where it can operate." These numbers refer to shade categories. The number associated with each light may be matched to a shade category where the light can be used.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
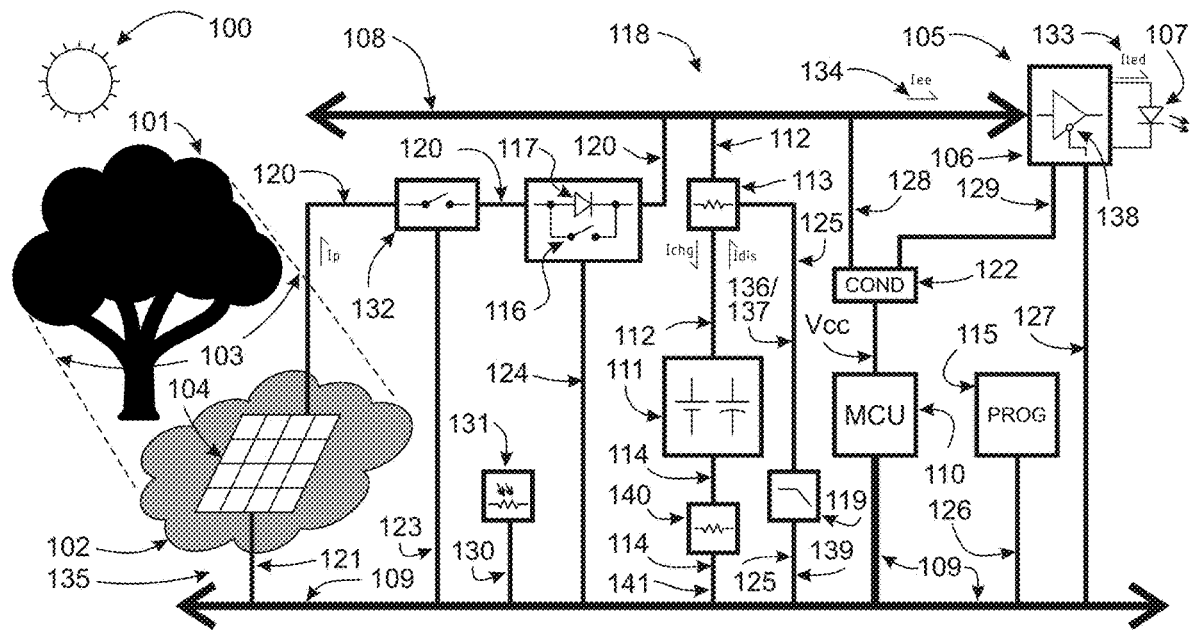
FIG. 1 is a block diagram of one embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

From reading the present disclosure, other variations and modifications will be apparent to persons skilled in the art. The variations and modifications may have equivalent and other features already known in the art, and which may be used instead of or in addition to the features described in the present invention.

Features described for separate embodiments may also be provided in combination in one embodiment. Conversely, various features described in the context of a single embodiment for brevity, may also be provided separately or in any suitable combination.

Although Claims have been formulated in this Application to certain combinations of features, the scope of the present disclosure also includes any novel feature or combination disclosed either explicitly or implicitly or in generalization thereof, whether or not it relates to the same invention as presently claimed in any Claim and whether or not it mitigates any or all of the same technical problems as the present invention.

It is to be understood that any exact measurements/dimensions or materials described herein are examples of suitable configurations and are not intended to be limiting in any way. Depending on the needs of the application, those skilled in the art will recognize, in light of the following teachings, various suitable alternatives.

In prior solar lights configured for controlled illumination, conventional wisdom may infer that an environment having standard ambient light is required to obtain sufficient solar energy for operation. This limitation has hindered adoption of these controlled-illumination devices in locations having substantial shade. Recent advancements in microcomputer units (MCUs) have been overlooked or underappreciated in enabling low-cost controlled-illumination solar lighting to operate in these locations.

A new theory of operation, discovered and tested by the Applicant, confirmed that, although difficult, a solar panel and MCU controller can be configured to operate with a substantial shade charging condition. Through careful planning and perseverance, satisfactory performance can be achieved without costly components. Markedly superior results can be achieved when the controller is configured to provide illumination commands which are responsive to the substantial shade charging condition. The controller may adapt (self-adjust) the illumination commands to provide brighter, longer lasting, or more appropriate nighttime illumination in a greater variety of environments than previously believed possible. A wider range of environmental, seasonal, and weather-related variations can be better tolerated, which helps to remove barriers to adoption.

The new theory of operation included many discoveries. One discovery revealed that well-planned firmware, although challenging to write, can indeed manage the controlled illumination for the substantial shade charging condition. Another discovery showed that illumination commands being responsive to the substantial shade charging condition are feasible and desirable. Another discovery, revealed by prototype testing, showed that satisfactory performance and lower cost can be achieved when 6 or less pins of the MCU are configured for a plurality of I/O connections, and at least one I/O connection is coupled to control the controlled illumination. Another discovery demonstrated brighter, longer-lasting nighttime illumination when the controller was configured to provide a shade illumination schedule responsive to the substantial shade charging condition.

-|- -|- -|- -|- -|-

According to a first implementation, an apparatus includes (a) a light unit (LU) and a controller which are configured to provide a controlled illumination, (b) a solar converter unit (SCU) and an energy storage device (ESD) which are configured to supply an energy output for the light unit to produce the controlled illumination. The solar converter unit is configured to charge the energy storage device during a substantial shade charging condition. And (c) the controller includes (i) a processor coupled to manage the controlled illumination, (ii) a memory accessible to the processor, and (iii) a program stored in the memory for execution by the processor to manage the controlled illumination.

The light unit may include a light-emitting device, for producing humanly visible illumination (visible light), and a light driver (electrical circuitry) for converting the energy output into a variable drive current Iled. The light driver may have a function input terminal to control Iled and affect the controlled illumination. The variable drive current may provide power to the light-emitting device and in doing so, make the illumination responsive to the variable drive current. Greater variable drive current may produce greater luminosity.

The solar converter unit and the energy storage device may supply the energy output configured as an electrical energy current Iee to the light driver. The solar converter unit can charge the energy storage device with substantial shade, even with little to no direct sunlight. A substantial shade charging condition is sufficient, but not required, for charging the energy storage device. The SCU can suitably charge the ESD with nothing more than the ambient light of substantial shade. To enable ESD charging in substantial shade and prevent ESD overcharging, the SCU may be configure in accordance with the teachings of the '992 patent.

The controller may include a microcontroller unit and/or a microcomputer unit (MCU). The controller may manage the illumination by adjusting the variable drive current via the function input terminal. An I/O connection may enable the controller to send one or more illumination commands to the light unit. An example I/O connection, without limitation, may include an LU data connection coupled to the processor and the function input terminal. The LU data connection is not limited to only the function input terminal. It may include other terminals and/or it may communicate other information between the light unit and the controller as required to achieve given objectives. This may include status information about the light unit being communicated to the controller, or through the controller to other devices.

This novel combination addresses an unmet need for providing controlled illumination powered by solar energy in an outdoor area having daytime substantial shade. Prior controlled-illumination devices cannot function well in this regard. They require a standard charging condition which makes them incompatible with substantial shade. And the other prior solar lights, which are designed for substantial shade, may include an MCU which cannot adjust the nighttime illumination.

The new combination also enables new advantages and benefits. For example, without limitation, the controller may provide an illumination command which is configured or optimized for the substantial shade charging condition. This may advantageously provide improved reliability because the controller can be programmed to automatically meter out the available stored energy for desired lighting throughout the nighttime, even if the solar converter unit had been in substantial shade during the daytime. Furthermore, embodiments ranging from accent lighting, convenience lighting, neighborhood lighting, multi-color lighting, to security lighting and more may be enabled for various locations whether they have substantial shade or not.

A new benefit is elimination of the numbers which indicate where to use solar lights configured for substantial shade. The controller may automate the process of matching the solar light to a shade category by adjusting the variable drive current. This is an improvement over the prior solar lights because sales and marketing efforts can be simplified. Consumers or end users do not need to be advised about matching category numbers with light numbers. They may simply acquire and install a solar light made in accordance with the teachings of the present invention. An end user's choice of installed location, be it substantial shade or sun, may be accommodated by the controller adjusting to not only the shade categories, but also to variations of solar insolation caused by weather and season. The seasonal aspect is relevant because some retailers may not be able to offer some of the prior solar lights for sale during seasons of low solar insolation. This limitation can be eliminated.

Combining substantial shade charging and controlled illumination enables greater flexibility and adaptability. It also enables a new concept feature which may be referred to as a shade illumination schedule. The illumination command may include an illumination schedule which adjusts and manages the variable drive current during nighttime. The illumination schedule may have one or more configurations being responsive to various parameters sensed by the controller such as, but not limited to, an SoC of the energy storage device, a charging current Ichg, one or more ambient light measurements collected by a photo sensor located in the substantial shade, a voltage of the energy storage device, and/or any other suitable input to the controller. The parameters may or may not be responsive to the substantial shade charging condition.

An embodiment of the first implementation may further include (a) the light unit having at least one light-emitting device, (b) the variable drive current flowing through the light-emitting device providing (c) a forward conduction voltage being responsive to the variable drive current to (d) power the controller. The light-emitting device may include at least one light-emitting diode (LED). All or some of the variable drive current may flow through the LED to produce the forward conduction voltage (LED voltage), which is reference to an LED anode terminal and an LED cathode terminal.

Utilizing the forward conduction voltage for controller power may provide a noteworthy cost-reduction by eliminating a voltage regulator. The LED can be selected to have an intrinsic current-voltage electrical characteristic that provides suitable voltage regulation for the controller. Such characteristics typically show a relationship between forward conduction voltage and current passing through the LED. The forward conduction voltage may be responsive to the variable drive current, increasing when the variable drive current is increased, and decreasing when the variable drive current is decreased. But the forward conduction voltage can be maintained in a suitable range for powering the MCU by considering the LED's current-voltage characteristic in view of an expected range of variable drive currents.

Another embodiment of the first implementation may further include (a) the controller being configured to sense the substantial shade charging condition, and (b) the controller providing the shade illumination schedule in response to the substantial shade charging condition. Another embodiment of the first implementation may include (a) the controller being further configured to sense a standard charging condition, and (b) the controller being further configured to provide a non-shade illumination schedule in response to the standard charging condition. The controller may have one or more I/O connections which are configured for enabling the controller to sense the charging conditions. After sensing the charging condition, the controller may respond by enabling the appropriate illumination schedule in a nighttime which follows. Without limitation, the I/O connections may provide information responsive to SoC, ambient light, the Ichg current, Idis current, and/or other relevant parameters. The controller may include one or more of these parameters when configuring the schedules.

Another embodiment of the first implementation may further include the I/O connection providing information about a state-of-charge of the energy storage device to the controller. The I/O connection may enable the controller, via suitably configured firmware, to receive the information and configure the illumination schedules accordingly. For example, without limitation, a relatively higher state-of-charge may enable the illumination schedule to provide greater luminosity and/or longer lasting illumination, for a given amount of energy.

The I/O connection may be provided by various devices. Without limitation, I/O connections may include one or more of the following elements communicating information (in analog or digital formats) to the MCU for evaluation. An SCU data connection for information regarding a solar voltage Vp and/or a solar current Ip of the solar panel. A PS data connection for information regarding ambient light incident on a photo sensor. An ESD data connection for information regarding one or more voltages of the energy storage device. An ESD sensor data connection for information regarding the Ichg and/or Idis currents of the energy storage device. One or more secondary controllers or devices may process, convert, condition, and/or interpret the information for the MCU.

Another embodiment of the first implementation may further include the controller having an I/O connection for enabling it to sense a charging condition of the energy storage device. The controller may have a shade illumination schedule for varying the variable drive current, which is enabled by the controller sensing that the substantial shade charging condition has occurred.

Any one or more of the I/O connection elements may be used to communicate the charging condition to the controller. For example, without limitation, the controller may analyze the SoC rate-of-change during charging, the SoC value obtained by charging, measurements of ambient light, and/or any other relevant information it receives.

Another embodiment of the first implementation may further include any suitable I/O connection which enables the controller to sense a standard charging condition. In response, the controller may provide a non-shade illumination schedule. The non-shade illumination schedule may be separate and unique relative to the shade illumination schedule. Or it may be a modification of the shade illumination schedule. Either way, the non-shade illumination schedule may be responsive to the standard charging condition.

The energy storage device may be charged by the substantial shade and the standard ambient light, mixed in various proportions by environmental or other factors. The controller may adapt to these environmental conditions by controlling, modifying, and/or blending the illumination schedules.

The present invention gains greater adaptability by configuring the illumination schedules responsive to the substantial shade and/or the standard ambient light. This allows more environmental conditions to be accommodated than the prior controlled-illumination devices. As described below, prototypes of the present invention included a controller which was configured to automatically configure, modify, or adjust the illumination schedules for the terrestrial biomes in which the prototypes were located.

The controller may add one or more schedule events to any illumination schedule. The schedule events may enable greater control of the light unit in response to the charging conditions. For example, without limitation, the controller may issue schedule events to modify or optimize the shade illumination schedule for the substantial shade. Schedule events may be inserted at any time within a schedule to enact a change in the illumination produced. A first schedule event may command the light unit to enable and/or increase the illumination for nighttime. A second schedule event may command the illumination to decrease later-on during the night. The first schedule event may command the light unit to drawn energy from the storage device faster early and the second schedule event may command energy drawn slower later. An appropriate implementation of one or more schedule events may configure the illumination schedule to be responsive to the charging condition.

The second schedule event may initiate (begin) an illumination ramp-down, transition, and/or step which decreases the illumination later in nighttime. This event may be triggered by a timer of the controller, a voltage of the energy storage device, the SoC of the energy storage device, ambient light, and/or any other appropriate parameter or parameters sensed by the controller, any one or more of which may be selected for governing parameters such as slope, shape, curvature, duration, timing, etc.

The controller may optimize the non-shade illumination schedule for better governance of illumination following a standard charging condition. For example, without limitation, this non-shade illumination schedule may produce brighter nighttime illuminations, determined mainly by the amount of energy received and/or stored, with little or no illumination ramp-down.

-|- -|- -|- -|- -|-

According to a second implementation, an apparatus includes a light unit, a solar converter unit, and energy storage device, and a controller. The light unit processes an energy output of the energy storage device. The light unit converts the energy output into humanly visible illumination according to one or more illumination commands. The light unit may have a strobe input terminal for receiving the illumination command. An I/O connection may be coupled to the strobe input terminal to communicate the illumination command from the controller to the light unit. The energy output of the energy storage device may include a discharge current Idis and/or an electrical energy current Tee.

The solar converter unit is configured to charge the energy storage device during a substantial shade charging condition. The energy storage device may also be charged by other charging conditions such as, but not limited to, a standard charging condition, direct sunlight, or combinations thereof.

The controller includes (i) a processor coupled to respond to the substantial shade charging condition, (ii) a memory accessible to the processor, and (iii) a program (firmware) stored in the memory for execution by the processor, to provide the illumination command responsive to the substantial shade charging condition. The processor's coupling may enable the controller to receive and transmit information. Without limitation, one or more suitable I/O connections, such as described above, may enable the controller to receive a communication of information about the charging condition. And another I/O connection, such as an LU data connection, may enable the controller to transmit the illumination command to the light unit.

The illumination commands may be configured responsive to the charging condition as described in the following example without limitation. An embodiment of the second implementation may include the illumination commands commanding the light unit to produce a period of predetermined illumination, which may occur early in nighttime. Later, a schedule event, such as the second schedule event described above, may command the light unit to decrease the illumination. The timing or start-of the schedule event may be governed by one or more charging parameters such as the voltage of the ESD, the SoC of the ESD, and/or an accumulation of the ambient light measurements. One or more of these charging parameters falling below a predetermined threshold may start the illumination decrease.

Accordingly, another embodiment of the second implementation may include the processor further being coupled to respond to the energy storage device. The shade illumination schedule includes the schedule event to decrease the humanly visible illumination in response to a voltage of the energy storage device falling below a predetermined threshold. Once started, the illumination decrease may continue (ramp-down) until the illumination reaches a predetermined lower limit, such as nighttime minimum illumination. Then, the shade illumination schedule may hold the illumination at the lower limit until the end of nighttime, or until the energy storage device is depleted, whichever occurs first.

The term "predetermined illumination" is used to refer to a period of the illumination schedule in which the nighttime illumination intensity may exhibit a pattern or value which is generally fixed or less variable. The length of the period may be fixed or variable. The period may be followed and/or preceded by other periods with rising or falling slope, transition, and/or undulation. The variations may be responsive to signals, inputs, and/or information received into the controller. In graphical form, for examples without limitation, a period of predetermined illumination may appear flat, inclined, sloped, stepped, curved and/or undulated.

Another embodiment of the second implementation may further include the controller being coupled to respond to an ambient-light sensor to identify nighttime and daytime. The ambient-light sensor may provide an AL output comprising information about the ambient light such as intensity, duration, period, etc. The AL output may be communicated to the controller via the PS data connection. The firmware may be configured for processing the AL output to identify nighttime and daytime. Without limitation, the ambient-light sensor may include, a photo sensor, a photoresistor, a light dependent resistor (LDR), a photodiode, a phototransistor, an SCU data connection, an ESD data connection, and/or another device suitable for enabling the controller to discern night and day. The SCU data connection may carry an AL output equivalent (in analog or digital format) approximated by the solar voltage, the solar current, or both. A decrease in the AL output may be interpreted by the controller as a transition from day into night. An increase be interpreted as a transition from night into day. Or the reverse may be true depending on circuit topology. Additionally, the ESD data connection may carry to the controller, information about the Ichg and/or Idis currents which may enable nighttime and daytime identifications.

Another embodiment of the second implementation may further include the following: (a) The illumination command includes an idle which enables the controller to receive sufficient voltage for operation during the daytime. And (b) the controller enables the idle, and disables the illumination schedule, when the controller identifies the daytime. To ensure that the controller maintains sufficient power for operation, the idle command may provide sufficient Iled current to power the MCU during daytime. During nighttime, the light unit may produce greater Iled current which may certainly be sufficient for powering the MCU.

In another embodiment of the second implementation the charging condition may include a standard charging condition. And the illumination command may include a non-shade illumination schedule being configured in response to the standard charging condition. For example, without limitation, when the controller senses the standard charging condition, this may be interpreted as sufficient solar energy being available to markedly increase the charge in the ESD and support stronger nighttime illumination. The controller may increase the nighttime illumination accordingly. Greater intensity of the standard ambient light in daytime may result in stronger nighttime illumination.

Another embodiment of the second implementation may further include the following: (a) The controller enables the shade illumination schedule, and disables the non-shade illumination schedule, in response to the period of exposure of ambient light of substantial shade. And (b) the controller disables the shade illumination schedule, and enables the non-shade illumination schedule, in response to the standard charging condition. The firmware may be configured to evaluate information conveyed over I/O connection and identify whether the charging condition predominantly contains the substantial shade or the standard ambient light. When it is mostly substantial shade, the shade illumination schedule may be enabled. When it is mostly standard ambient light, the non-shade illumination schedule may be enabled. A transition between the schedules may be gradual or abrupt, with or without hysteresis. During a transition, neither charging condition may be dominant. The controller may blend the schedules and/or convert one schedule into the other.

-|- -|- -|- -|- -|-

According to a third implementation, an apparatus includes a solar light and a controller. The solar light includes (a) a light unit powered by an energy storage device for producing humanly visible illumination being responsive to a function input terminal, and (b) a solar converter for charging the energy storage device. One or more I/O connections may be included for providing an input and/or an output between the solar light. The input may enable the controller to control at least one function of the solar light. The output may provide at least one sensed condition of the solar light for the controller. The input and the output may occur simultaneously, non-simultaneously, intermittently, or continuously, depending on given objectives.

For an objective of lower cost, the controller has an integrated circuit (IC) package which includes (i) 6 or less pins for the I/O connections, at least one I/O connection being coupled to the function input terminal, (ii) a memory accessible to a processor, and (iii) a program (firmware) stored in the memory for execution by the processor to enable the controller to manage the humanly visible illumination. For example, without limitation, the controller may receive the output from the solar light, processing the sensed condition of the solar light, and provide the input to the solar light via the function input to control the illumination. A one-to-one correspondence of the pins to the I/O connections is not required. For example, without limitation, one pin may be configured to support one or more I/O connection, one I/O connection may be configured to include one or more pins, and/or multiple pins may be configured to support multiple I/O connections.

A given I/O connection may support unidirectional operation (handling only input or output data) or bidirectional operation (handling input and output data). The inputs and outputs carried by the I/O connection may include analog and/or digital signals. Digital signals may have predefined voltage levels representing 0 and 1. Analog signals may have variable voltage levels with predefined upper and lower limits. Without limitation, examples of these signals may include the follow: The energy storage device may provide one or more outputs responsive to its voltage, current, and/or SoC. The solar converter may provide one or more outputs responsive to ambient light, a solar voltage and/or a solar current. The light unit may receive inputs for controlling its functions. The light unit may provide outputs providing information about its status or operation. A photo sensor may provide an output responsive to ambient light. The controller may send or receive any of these signals via the pins. A DAC may provide one or more analog output signals. An ADC or an AC may receive one or more analog signals. A GPIO may send or receive digital signals, which may include pulse-width-modulation (PWM).

An embodiment of the third implementation may further include (a) the solar converter being capable of charging the energy storage device during a substantial shade charging condition, and (b) the 6 or less pins including a multi-purpose pin. The solar converter unit may have PV cells which are configured to produce an output derived from solar energy which is suitable for charging the energy storage device, even while exposed to only the ambient light of substantial shade.

Any of the I/O connections may be configured to include the multi-purpose pin. The multi-purpose pin may support 2 or more inputs and/or outputs, enabling a total number of all the inputs and outputs of the controller to be greater than 6, which is a maximum number of pins dedicated for I/O connections. When counting the pins, 2 pins may be added for the power and ground, to increase the total pin-count to 8 or less.

Another embodiment of the third implementation may further include a switch coupled to the controller via the multi-purpose pin. The switch may include an SCU switch being configured to modify a charging current Ichg of the energy storage device to prevent overcharging. An SCU switch data connection may be coupled via the multi-purpose pin to provide a current-limiting PWM output from the controller to control the SCU switch.

The multi-purpose pin may also be coupled to enable the controller to respond to the solar converter unit. This configuration of the multi-purpose pin may enable the controller to control the switch and receive a solar voltage input from the solar converter unit. Since the multi-purpose pin is coupled to the SCU switch and to the solar converter unit, the controller may include firmware suitably configured to identify day/night and prevent overcharging, with just one multi-purpose pin.

The controller may readily change the multi-purpose pin between input and output modes. While in the input mode, the controller may sample and measure a solar voltage, which is responsive to ambient light, to ascertain whether the current time of day is daytime or nighttime. While in the multi-purpose pin is in the output mode, the controller may activate (turn-on) the SCU switch to shunt the solar current through the SCU switch and decrease the Ichg current.

The SCU switch may be coupled in parallel with the solar converter unit to create a short circuit between two output terminals of the solar converter unit. Activating the switch may close it and shunt the solar current away from the energy storage device. Alternatively, the SCU switch may be coupled in series with the solar converter unit to create an open circuit at an output terminal of the solar converter unit. In this configuration, activating the switch may open it and stop the solar current from flowing to the energy storage device. Regardless of whether series or parallel connections are employed, the SCU switch may be said to be active when it decreases or stops the solar current. The SCU switch may be said to be inactive when it has little to no effect on the solar current.

The controller may utilize these configurations to decrease the Ichg current by utilizing the current-limiting PWM output for controlling the SCU switch. This PWM output may prevent overcharging by decreasing the average solar current flowing into the energy storage device.

Another embodiment of the third implementation may further include the controller being coupled to respond to a current-sensing input signal, via the multi-purpose pin. For example, without limitation, the solar converter unit may provide a charging current Ichg to charge the energy storage device, and the energy storage device may provide a discharge current Idis to power the light unit. An ESD sensor may provide the current-sensing input signal being responsive to the charging current Ichg and/or the discharge current Idis. The ESD sensor may be coupled to enable the controller to respond to the current-sensing input signal, via the multi-purpose pin. This configuration of the multi-purpose pin may (a) support prevention of overcharging while the multi-purpose pin receives the first signal responsive to the Ichg current, and it may (b) support management of the humanly visible illumination while the multi-purpose pin receives the second signal responsive to the Idis current. The controller may toggle the multi-purpose pin between receiving the first and second signals, depending on which current is predominantly flowing through the ESD sensor.

The first and second inputs may occur simultaneously but non-simultaneously is preferred. During daytime, the multi-purpose pin may receive a communication of information regarding the Ichg current (the first input) which enables the controller to determine whether overcharging is occurring. During nighttime, the multi-purpose pin may receive a communication of information regarding the Idis current (the second input) which enables the controller to maintain the discharge current at a predefined value.

-|- -|- -|- -|- -|-

According to a fourth implementation, an apparatus includes (a) a light unit and a controller which are configured to provide a controlled illumination, (b) a solar converter unit and an energy storage device (ESD) which are configured to supply energy for the light unit to produce the controlled illumination. The solar converter unit is configured to charge the energy storage device during a charging condition. And (c) the controller includes (i) a processor coupled to respond to the charging condition, and manage the controlled illumination, (ii) a memory accessible to the processor, and (iii) a program stored in the memory for execution by the processor to provide a shade illumination schedule during a nighttime in response to a daytime in which the charging condition had a substantial shade charging condition.

The light unit may include a light driver for providing a variable drive current for a light-emitting device. The light driver may have a function input terminal for controlling the variable drive current and the controlled illumination. The solar converter unit may provide an energy output to charge the energy storage device, even if it receives little to no direct sunlight. A substantial shade charging condition may be sufficient for charging the energy storage device. The controller may include an MCU with an I/O connection coupled to the function input terminal, to send one or more illumination commands to the light unit and manage the controlled illumination.

This novel combination addresses an unmet need for providing controlled illumination responsive to an amount of stored solar energy being collected from an outdoor location comprising the substantial shade during daytime. Prior devices cannot function well in this regard because they do not have shade illumination schedules.

An embodiment of the fourth implementation may further include the controller being configured to enable a non-shade illumination schedule after the charging condition had a standard charging condition. In this regard, the controller may replace the shade illumination schedule with the non-shade illumination schedule, which may be configured to increase the controlled illumination responsive to a greater amount of stored solar energy collected from the standard ambient light.

In another embodiment of the fourth implementation, the substantial shade charging condition may be of longer duration than the standard charging condition. In response to this mixed charging condition, the controller may disable the non-shade illumination schedule and provide the shade illumination schedule instead due to its greater length.

Another embodiment of the fourth implementation may include the shade illumination schedule having a period of predetermined illumination, which may occur early in nighttime, followed by a schedule event which decreases the controlled illumination. The timing or start-of the schedule event may be governed by a voltage of the energy storage device crossing a predetermined threshold. The ESD voltage may have a correlation to energy storage, which enables the predetermined threshold to be a proxy for an amount stored energy remaining in the ESD.

-|- -|- -|- -|- -|-

According to a fifth implementation, an apparatus includes a light unit, an energy storage device, a solar converter unit, a diode bypass switch, and a controller. (a) The light unit receives power from the energy storage device. (b) The solar converter unit recharges the energy storage device. (c) The diode bypass switch is coupled to carry an electrical current between the energy storage device and the solar converter unit. And (d) the controller includes a processor, a memory, and a program (firmware) stored in the memory for execution by the processor. (i) The processor is coupled to control the diode bypass switch. (ii) The memory is accessible to the processor. And (iii) the firmware enables the controller to control the diode bypass switch and prevent the electrical current from discharging the energy storage device. A diode bypass switch data connection may be included to allow the controller to control the diode bypass switch.

When there is sufficient ambient light, a solar voltage produced by the solar converter unit may be greater than a voltage of the energy storage device. The solar voltage enables the electrical current to include a charging current Ichg which flows through the diode bypass switch when it is closed, adding charge to the energy storage device. An embodiment of the fifth implementation may further include an SCU diode which is coupled to enable the Ichg current to bypass the diode bypass switch. The SCU diode may carry the Ichg current around the diode bypass switch when the diode bypass switch is open.

The diode bypass switch and the SCU diode may be separate devices, each having an IC package. Or they may be included in a one-package device. For example, without limitation, the one-package device may include a metal-oxide-semiconductor field-effect transistor, such as a Diode and Switch Transistor (MOSFET) Q1. The MOSFET channel may provide the diode bypass switch. The MOSFET intrinsic diode (body diode) may provide the SCU diode. The diode bypass switch data connection may enable the controller to provide a control signal (a gate voltage) to the MOSFET (gate terminal). The control signal may turn-on the MOSFET, putting it into an ON state which decreases a channel resistance of the MOSFET. This may create a short circuit around the SCU diode in effect closing the diode bypass switch. The control signal may turn-off the MOSFET, putting it into an OFF state which increases the channel resistance. The diode bypass switch data connection may comprise, for example without limitation, an I/O port of the processor coupled to provide the control signal from the controller to the gate terminal of the MOSFET. Alternatively, other circuitry may be included as needed to achieve this objective.

If there is relatively low ambient light while the diode bypass switch is closed, and the solar voltage may be less than the voltage of the energy storage device, the Ichg current can flow backwards discharging the energy storage device through the solar converter unit. The controller may prevent the discharge by turning off the MOSFET which opens the diode bypass switch to disable the short circuit around the SCU diode. The controller may receive a sensory input being responsive to this low-light condition to inform the controller when to set the control signal to OFF. With the diode bypass switch opened, the Ichg current may decrease to a small leakage current through the diode which cannot substantially discharge the energy storage device. For example, without limitation, the sensory input may be provided by the solar voltage of the solar converter unit, a photo sensor, and/or an ESD sensor.

Another embodiment of the fifth implementation may further include the following: (a) An SCU data connection is coupled to provide the controller the sensory input which is responsive to a charging condition of the solar converter unit. And (b) the controller closes the diode bypass switch when the sensory input indicates the charging condition cannot substantially discharge the energy storage device. While analyzing the sensory input the controller may determine there is sufficient (or nearly sufficient) ambient light for charging. In a practical embodiment, the controller may close the diode bypass switch as the ambient light is increasing, but before the solar voltage is greater than the voltage of the energy storage device. This may allow the discharge current to flow, relatively insignificantly, until the low-light condition is removed by the increasing ambient light. The firmware may be configured to evaluate the sensory input and close the diode bypass switch when it determines that the ambient light has sufficiently increased to prevent the charging condition from substantially discharging the energy storage device.

By closing the diode bypass switch, the controller may short-circuit the diode, eliminate its forward voltage drop, and improve charging efficiency. With little or no power lost to the diode or to the switch, more energy may be delivered an stored in the energy storage device.

Another embodiment of the fifth implementation may further include an SCU data connection being coupled to provide the sensory input which is responsive to a solar voltage of the solar converter unit. The controller may compare the solar voltage to a predetermined threshold to determine the charging condition. If there is sufficient ambient light for charging, the solar voltage may cross the threshold, going above or below the threshold depending on circuitry configuration. The controller may respond by setting the control signal to ON to turn-on the MOSFET via the SCU diode data connection which closes the diode bypass switch to bypass the diode. If there is insufficient ambient light for charging, the solar voltage may not cross the threshold, which enables the controller to ascertain that the low-light condition exists. The controller may respond by setting the control signal to OFF to enable the diode and prevent the discharge current from flowing through the solar converter unit.

-|- -|- -|- -|- -|-

The solar converter unit being in a period of exposure to ambient light of substantial shade may be referred to as a "substantial shade charging condition". Alternatively, the solar converter unit being in a period of exposure to standard ambient light may be referred to as a "standard charging condition".

The term "period" is used to refer generally to one daytime of charging the energy storage device. But it may refer to other time durations as well, depending on given design objectives and constraints. Furthermore, the period may be any length of time in which the present invention gains more state-of-charge (SoC) in substantial shade exposure than the prior controlled-illumination devices are capable of, given equivalent charging condition such as, but not limited to, ambient light, initial SoC, Ichg current limiters or shunts, Idis current while charging, temperature, humidity, component aging, characteristics, and/or stresses, etc. The terms "charge" and "charging" are used to refer to a process of adding electrical energy to the energy storage device to increase its SoC.

The term "controlled-illumination" is used to refer to a device in which the light unit and the controller are configured for providing variable, humanly visible illumination. The term "controlled illumination" is used to refer the variable, humanly visible illumination produced by the controlled-illumination device. Without limitation, the variable, humanly visible illumination may include adjustments in luminosity, color, hue, color temperature, messaging, timing, change versus time and/or duration. One skilled in the art may utilize the teachings of the present invention to configure a device and obtain controlled illumination in accordance with desired objectives which can include operating the device in substantial shade.

The term "Ichg" is used to refer to a charging current of the energy storage device (ESD). The term "Idis" is used to refer to a discharge current of the ESD. The term "Iled" is used to refer to the variable drive current. The term "Iee" is used to refer to an electrical energy current for providing electrical energy to the light driver. The terms "Ip" and "Vp" are used to refer to the energy output of the SCU. They include the solar voltage (Vp) and the solar current (Ip). A given current may include direct current (DC) and/or alternating current (AC). Typically, currents have DC and some smaller amount of AC to produce magnitude variations and/or PWM. Likewise, a given voltage disclosed herein may include direct voltage, alternating voltage, or a combination of both.

The Ichg current may be responsive to the intensity of ambient light impinging on the solar converter unit. Stronger ambient light may produce greater Ichg current. The Idis current may be responsive to the Iled current. The light driver may receive the Tee current to produce the Iled current responsive to illumination commands received from the controller. When the SCU has the low-light charging condition (little or no ambient light), Ichg may be practically zero, greater Iled current may draw greater Tee current, and Tee may equal Idis. When the SCU has a charging condition, Ichg may be greater than zero, and Tee may be drawn from the SCU and/or the ESD.

The term "state-of-charge" (SoC) is used to define a condition of the energy storage device. SoC may be represented as a percentage of the nominal charge storage capacity. For example, 100% SoC may indicate that the energy storage device has a nominal charge, a full charge, or is completely recharged. An SoC of 0% may indicate a condition of being not charged, or completely discharged. A less than 0% SoC may indicate discharge or deep discharge. A greater than 100% SoC may indicate overcharged or fully recharged since some rechargeable batteries may require 120% SoC or more to be fully recharged because some of the energy provided for storage may be dissipated as heat and/or lost to inefficiencies.

The term "energy storage device" is used to define a device for storing electrical energy. An energy storage device may include one or more rechargeable batteries and/or one or more supercapacitors. These may be coupled in series and/or parallel. Nominal charge storage capacity (Cn) may be specified by manufacturers of these devices. For rechargeable batteries, the Cn may have a unit of milliamp-hours (mAh) or a unit of ampere hours (Ah). Cn may be the planned capacity or capability. For supercapacitors, the capacity may have a unit of farad-volts (F-V). An equation, $Cn = CAP \times deltaV/3.6$, may relate F-V to mAh. Cn may approximate the supercapacitor storage capacity in mAh, CAP may represent capacitance in Farads, and deltaV may represent a change in terminal voltage of the supercapacitor while providing Idis current.

The term "substantial shade" is used to define a suitable operating environment of the present invention, where the solar converter unit may be located. It may include total shade, full shade, deep shade, and/or some shade categories of the '992 patent. Additionally, the substantial shade may be produced by atmospheric and/or terrestrial obstacles (shading objects) which prevent a line-of-sight between the solar converter unit and the sun. The substantial shade may be created by weather. But it is generally more persistent and causes problems with the prior-art controlled-illumination devices. One such problem was described in the '659 patent which described a battery pack as being "minimally charged due to very foggy weather or a cloudy day (2000 lux or lower)", emphasis added.

The substantial shade may have patches of direct sunlight (unobstructed line-of-sight to the sun) which enter the shaded area through small openings between the shading objects. The substantial shade may have fewer or smaller sunlight patches and unsuitable ambient light for recharging the prior-art controlled-illumination devices. But the ambient light of the substantial shade is suitable for charging the energy storage device of the present invention, via the solar converter unit, even if the substantial shade typically contains only diffused or scattered sunlight.

The present invention does not require direct sunlight for continuity of operation. It does not require direct sunlight to create or increase an energy reserve in the electrical storage device. The energy reserve is not needed for sustaining nighttime illumination during extended periods of inclement weather or low solar insolation. The present invention may operate days, weeks, months, or indefinitely on solar energy from the ambient light of substantial shade. But the invention may endure suboptimal operating environments, such as direct sunlight exposures, without deleterious effects. Moreover, the invention's controller may automatically increase nighttime illumination in response to occasional direct sunlight.

The term "occasional direct sunlight" is used to further define the optimal operating environment of the present invention. Direct sunlight may enter the operating environment by movements of the shading objects relative to the sun and/or the solar converter unit. The movements may enable temporary direct sunlight. The occurrences of occasional direct sunlight may be aperiodic or periodic (hourly, daily, seasonal). The present invention's controller may sense the occasional direct sunlight and advantageously utilize any surplus solar energy provided. The controller may create or increase an energy reserve in the energy storage device, in effect, saving energy for a rainy day. It may manage the illumination in a manner that dissipates the extra stored energy through increased nighttime illumination. It may allow a portion of the extra stored energy to be stored while the remainder is dissipated by illumination. And/or, if there is sufficient solar energy, the controller may invoke a method of measuring an energy storage capacity of the energy storage device.

This energy storage capacity measurement method may include a charging step in which the controller enables the solar converter unit to fully recharge the ESD. This may be well accomplished during exposure of direct sunlight. A discharging step may include the controller enabling the light unit to completely discharge the ESD while the controller measures the energy provided. Increasing the humanly visible illumination to a relatively high or maximum amount may be included in the discharging step. A calculating step may include the controller calculating an energy storage capacity based on (or equal to) the energy measurement. A storing step may include the controller storing the energy storage capacity in the memory as a numerical value. The discharging step may include a measuring step in which the controller receives and records information about Idis versus time. The calculating step may include the controller calculating a product of Idis and time, or related parameters, to determine or represent the energy storage capacity of the ESD. The controller may utilize the measured energy storage capacity as a limit during future recharging. This may prevent the solar converter unit overcharging the ESD in the future charging cycles. If the measured energy storage capacity is below a functional limit, the controller may indicate such SoC status by flashing the light-emitting device, for example, to request the ESD be replaced or repaired.

The term "standard ambient light" is used to define an operating environment of the prior-art controlled-illumination devices. In general, light meter measurements of standard ambient light may be greater, more reliable, and/or higher on average than the measurements of substantial shade. Without limitation, examples of standard ambient light may include (a) direct sunlight, (b) reflected sunlight, wherein an object or a surface reflects direct sunlight onto the solar converter, (c) intermittent shade (d) temporary shade, (e) partly shady, (f) partly sunny, and/or (g) diffused sunlight, wherein sunlight may be scattered by weather conditions and/or objects in a manner that produces greater light meter measurements.

The solar converter unit may include one or more photovoltaic (PV) cells, also known as solar cells. These are electrical components, well known in the art, that convert photons into electricity. In the present invention multiple PV cells may be arranged into an array and interconnected within the solar panel. The solar converter unit provides an output of electrical energy that may be referred to as a solar voltage and a solar current. Without limitation, the solar convert unit may include other devices to help facilitate the energy output such as bypass diodes connected in parallel with one or more PV cells to enable solar current from sunlit solar cells to flow around shaded or defective solar cells. A power converter may be included to increase the solar voltage or the solar current. But these other devices are not required when the PV cells are configured to produce a suitable energy output for charging the energy storage device, even while exposed to only the ambient light of substantial shade. In other words, even if all the PV cells are shaded from direct sunlight during daytime, the energy storage device can still receive a functional charge, if not a full charge.

The energy storage device may include one or more rechargeable batteries, supercapacitors, and/or other devices capable of storing electrical energy. The preferred embodiment may include only one rechargeable battery for lower cost, but more can be configured for applications requiring higher voltage and/or current.

The present invention may further utilize occasional direct sunlight, or standard ambient light, to provide additional benefits, such as brighter nighttime illumination, a cache of reserved energy in the energy storage device, and/or measurement of an energy storage capacity of the energy storage device. But there are also significant design challenges with this new approach, especially in configuring suitable low-cost embodiments of the present invention for mass production.

In an embodiment of the present invention the controller MCU may include a processor (CPU), a memory (SRAM, Flash, and/or EEPROM) accessible to the processor, a plurality pins for input-output (I/O) connections, at least one power-input (VDD) pin, and at least one ground (GND) pin. The MCU may be a mass-produced product which includes multiple pins for connecting to the processor and peripheral devices within the package. The peripheral devices may include, without limitation, one or more general purpose I/O port (GPIO), port multiplexor (PORTMUX), timer/counter (TCx), clock controller (CLKCTRL), analog-to-digital converter (ADC), digital-to-analog converter (DAC), nonvolatile memory (EEPROM), clock controller, sleep controller (SLPCTRL), port configuration (PORTx), interrupt controller (CPUINT) pin for external interrupt, event system (EVSYS), reset controller (RSTCTRL), brownout detector (BOD), voltage reference (VREF), watchdog timer (WDT), real time counter (RTC), interrupt controller (CPUINT), universal synchronous/asynchronous receiver/transmitter USART, two wire interface (TWI), serial peripheral interface (SPI), system configuration (SYSCFG), nonvolatile memory controller (NVMCTRL), signature row (SIGROW), device specific fuses (FUSES), user row (USERROW), communications device, programming interface, communications interface, CRC checker (CRC SCAN), custom logic (CCL), I/O line, and/or analog comparator (AC).

The term "pin" is used to define a terminal of an electrical device. The pin may include metal or other electrically conductive material. The pin may be embedded or encased in an IC package. A portion of the pin may protrude from the package for connecting with other electrical devices. The package may be constructed of plastic or other non-conductive material. In an alternate configuration, the pin may not prude from the package, having instead an electrically conductive area (or coating) on the surface of the package.

There are many types and styles of MCUs commercially available. One challenge associated with the present invention is selecting an appropriate MCU having sufficient computational speed, memory capacity, and peripheral devices, as well as low cost and high reliability. Selecting an MCU having an IC package with 8 pins or less can decrease its cost, but it can also make each pin a scarce resource to be utilized with greater care and planning. At least two pins are typically dedicated for a power supply and ground connections. The remaining 6 pins or less may be configured for one or more I/O connections. The VDD and GND pins are not counted as I/O connections even though the controller may be configured to sense its power supply voltage via the VDD pin, and the GND pin may provide a reference potential voltage. A dedicated programming pin (configured for programming but not used for I/O) is not counted as an I/O connection. A non-dedicated programming pin (configured for programming and for I/O) is counted as an I/O connection.

When the firmware is written to configure less than seven I/O connections, an 8-pin IC package may be employed to decrease device cost, relative to other packages having more pins. To offset the scarcity of pins, one or more of the pins may be configured for multi-purpose use. This may decrease the total number of pins required and enable the 8-pin package to be utilized. A multi-purpose pin may have two or more I/O connections configured to operate with the same pin to carry signals into and/or out of the MCU IC package.

The term "I/O connection" is used to refer to one or more wires, electrical circuits, and/or electrical components which are configure for shuttling information and/or signals between any devices, components, parts, etc. These may utilize information exchange protocols known in the art, or novel protocols as may be required to achieve given objectives. For example, without limitation, an I/O connection may carry the illumination commands from the controller to the light unit, and another I/O connection may include the ESD sensor data connection for sending Ichg and/or Idis information from the energy storage device to the controller. Each I/O connection may include one or more pins of the controller. Different I/O connection may share one or more pins of the controller, with the firmware being configured to appropriately manage such a configuration.

The term "PWM is used to describe a method of reducing the average power delivered by an electrical signal. The average value of voltage (and current) fed to the load is controlled by switching the signal on and off. The longer it is on compared to off, the more voltage, current, and/or power is provided. The PWM switching frequency may be fixed or variable. The PWM switching frequency may be high enough that the resultant waveform is in effect perceived by the load as smooth or not interrupted. For example, without limitation, illuminating an LED with PWM may require higher switching frequency than charging a battery with PWM to achieve perceptions of non-interruption. The LED may require pulses with 20 milliseconds or less off-time between them. For charging the battery, an off-time of seconds, minutes, or hours may be sufficient. A duty cycle may describe a percentage of on-time divided by a period of the PWM switching frequency. Greater on-time may increase the duty cycle. Less on-time may decrease the duty cycle. For a given pulse width, increasing the switching frequency may increase the duty cycle and decreasing the switching frequency may decrease the duty cycle.

-|- -|- -|- -|- -|-

One MCU device selected for construction of a first prototype and a second prototype of the present invention had a part number ATtiny212/412. The "tiny" series of products includes MCUs having up to 20 pins. Packages with 8 pins were selected in accordance with an objective of decreasing cost. This style of MCU had one VDD pin and one GND pin. The firmware was written to configure five pins for I/O connections (PA1, PA2, PA3, PA6, PA7) and one pin (PA0) for the programming interface.

The first prototype had the PA0 pin configured for programming. The second prototype had the PA0 pin configured for an I/O connection and for programming. The term "programming" refers to a procedure established by an MCU manufacturer for loading firmware programs into the flash memory. Programming may utilize a designated pin (such as PA0) for reading, writing, and/or verifying contents of the MCU memories. The MCU manufacturer may provide an MCU programmer device and/or a software-development kit (SDK) that helps facilitate writing, testing, and loading the firmware program into the MCU memory. The PA0 pin being used for programming and I/O may be common or well known. Programming is not an example of multi-purpose within the context of the present invention. A multi-purpose pin supports two or more operational features excluding programming.

The first prototype included an energy storage device consisting of one NiMh rechargeable battery having a battery nominal voltage of about 1.2 volts. The solar converter unit included a 4-cell solar panel having four monocrystalline PV cells connected in series. The energy storage device of the second prototype consisted of one lithium rechargeable battery having a battery nominal voltage of about 3.2 volts to 3.7, depending on the selected battery style. Its solar converter unit included a solar panel having nine PV cells connected in series. These relatively simple solar panel configurations of the prototypes helped to support the low-cost objective.

The lithium battery of the second prototype was observed to have high battery voltage (greater than 4 volts) during daytime charging. To prevent this, the firmware was configured to turn-on the light driver and remove some of the stored charge during daytime. The controller activated the SCU switch while the light unit was turned on to ensure that the energy dissipated by the light unit came from the energy storage device instead of the solar converter unit. This firmware configuration switched the humanly visible illumination on and off during daytime. It was especially noticeable when the solar converter unit was exposed to a longer period of direct sunlight which completely recharged the energy storage device.

In a preferred embodiment of the present invention the light-emitting device may include one or more light-emitting diodes (LEDs) because LEDs typically have lower cost and greater efficiency than halogen light bulbs, for example. But other devices that convert electricity into visible light may be employed for achieving other design objectives. The illumination color produced may be white, off-white, single-color, multi-color, variable-color, and/or color-changing. The light unit may provide multiple variable drive currents for multiple LEDs. The resulting illumination color may be a combination of the LED light outputs.

The prototypes each had one LED. The variable drive current flowed through the LED to produce the humanly visible illumination. The LED and the drive current provided a forward conduction voltage (LED voltage) which was responsive to the variable drive current. The LED voltage varied from at less than 2 volts DC to more than 3.15 volts DC, depending on the magnitude of the variable drive current.

In the first prototype the light driver included a voltage converter because the battery nominal voltage was less than the nominal LED forward conduction voltage. The voltage converter increased a light driver PWM output voltage to enable forward conduction of the LED to let the variable drive current flow through the LED. The LED limited this PWM output voltage to a driver voltage relative to the GND. The driver voltage was approximately equal to the LED voltage plus smaller voltages consisting of a sampling voltage across an LU Sampling Resistor (Rs) R3, a Signal Responsive to Ichg 136 across an Idis Sensing Resistor R1, and a Signal Responsive to Idis 137 across an Ichg Sensing Resistor R2. The voltage converter included PWM circuitry comprising an LU IC and an inductor for enabling the voltage converting process. A Light Driver Current Idri 205 was produced by the LU IC energizing the inductor for the voltage conversion process. The Idri current may have been greater than the Iled current, reflecting a loss of drive current due to the voltage converter an inefficiency of the electrical components.

The light driver PWM output fundamental frequency was about 1 MHz which allowed smaller, lower cost, inductors than many prior-art devices that operate at lower frequency, below about 200 KHz. The fundamental frequency is preferably greater than 500 KHz. It could have been 100 KHz, 1 KHz, 100 Hz, or lower but that may have increased inductor size and/or cost.

The second prototype did not have a voltage converter because the battery nominal voltage was greater than the nominal LED voltage. Instead, it had a MOSFET transistor (Q3) for switching the battery voltage applied to the LED. The strobe could have been configured as an analog signal, instead of the digital PWM configuration. But that may have increased the cost and complexity of circuitry for the light unit strobe input terminal. In the second prototype the driver voltage was approximately equal to the LED voltage plus smaller voltages consisting of a saturation voltage of the Q3, the Signal Responsive to Ichg 136 across the Idis Sensing Resistor R1, and the Signal Responsive to Idis 137 across the Ichg Sensing Resistor R2.

Each prototype had one MCU comprising an 8-bit processor in the 8-pin package with up to six I/O connections configured by the firmware. A major challenge was encountered planning, writing, and testing the firmware for these prototypes. Because, in comparison to the prior-art controlled-illumination devices, the firmware of the present invention operates with wider input variations of the operating environment. These variations can include, without limitation, substantial shade, standard ambient light, or combinations thereof. In operation, the substantial shade can decrease the average SoC of the energy storage device which leaves less margin for firmware faults (errors or mistakes). A fault that tries to provide too much illumination with low SoC can collapse the energy storage device's output voltage and risk shutting-down the controller. The prior-art controlled-illumination devices may exhibit such faults if operated in substantial shade or other unplanned for environments.

An objective of the prototypes' firmware programs was to utilize lower cost MCU packages (having 8 pins or less) and provide better fault prevention in substantial shade charging conditions. Pin (PA6) was configured for sensing the battery voltage. This enabled the controller to monitor the voltage and decrease the illumination as needed to avoid the collapse. Pin PA1 and PA7 were configured for multi-purpose to decrease MCU cost by enabling the 8-pin MCU package to be utilized. The PA1 pin had two I/O connections. One I/O connection carried an analog output voltage responsive to Ichg. The other I/O connection carried an analog output voltage responsive to Idis. Although these outputs may have occurred simultaneously and provided the controller a combined analog input, the controller was configured to sense ambient light on the solar panel which enabled it to distinguish between Ichg and Idis.

The PA7 pin also had two I/O connections. The first I/O connection carried output voltage from the solar panel responsive to the charging condition. In the first prototype, this included an ambient-light output voltage (AL output) which was responsive to ambient light received by the solar panel. The controller utilized the AL output to distinguish between daytime and nighttime. Alternatively, the analog output voltage responsive to Ichg could have been used for this purpose. The second I/O connection carried a PWM shunt control signal, provided by the controller, to a Shunt Switch Transistor (MOSFET) Q2. The PWM shunt control signal was configured by the firmware to toggle Q2 on and off, decrease Ichg, and prevent battery overcharging.

The PA1 and PA6 pins helped the controller monitor and evaluate the SoC, which enabled illumination to be adjusted and appropriately managed in response to the available energy stored in the ESD. The firmware configured the illumination schedule for brighter illumination when the SoC was sufficient to support it. When SoC was less, the firmware modified the illumination schedule, and/or enabled a different illumination schedule, to provide dimmer nighttime illumination.

Adding substantial shade to the slate of allowable charging conditions created new challenges and opportunities with the firmware. Among the challenges was the relatively low solar energy provided by the substantial shade, which may have increased the firmware design-time (to write the program) and the memory required (to store the program in the MCU).

After two years of software engineering and prototype testing, the firmware programs had grown to occupy more than 90% of the available flash memories of each MCU. The prototypes were tested outdoors in two different terrestrial biomes, located about 1700 miles apart. A temperate forest located near Indianapolis, Ind., and a desert located near Tucson, Ariz., provided extreme input variations necessary for the testing tasks. Many problems were overcome such as numerical overflow and erratic performance, which were caused by the expected huge solar insolation variations encountered. Another problem was caused by an unexpected faster aging of the solar panel and the battery in the desert. The challenges created by the desert were remarkable due to its extreme variations of temperature, humidity, and solar insolation. The solar panel aging, which was encountered, decreased the SCU energy output over time. The battery aging decreased the ESD energy storage capacity over time. One solution for these aging problems included the firmware being configured to enable the processor to emulate a control system having a feedback signal responsive to the Idis current (Idis feedback signal). This configuration of processor and firmware enabled the controller to maintain the discharge current at a predefined value, independently of the aging factors and other variables such as battery voltage.

Another advantage of the Idis feedback signal is better adherence of the light unit to illumination commands issued by the controller. Within the controller, the processor may request Idis to have a predefined amplitude value. The processor's request may be submitted to the control system which may then issue and adjust the illumination command to obtain the required Idis. The better adherence is desirable because operating in substantial shade can create lower SoC in general and increase risk of failure from firmware faults. The control system may decrease or eliminate the risk.

Functional operation of the control system can be verified by attenuating the Idis feedback signal before it reaches the controller. An Idis voltage divider may be added to the Idis feedback signal pathway to provide the attenuation. A method of verifying operation of the control system includes the steps of configuring the Idis voltage divider with a testing switch to decrease the Idis feedback signal when the switch is closed, charging the ESD in substantial shade during daytime with the testing switch opened, waiting for nighttime, observing the humanly visible illumination during nighttime with the Idis voltage divider disabled (switch open), closing the testing switch to enable the Idis voltage divider, and observing the humanly visible illumination with the Idis voltage divider enabled (switch closed). The control system is verified operational when closing the testing switch increases the illumination and opening the testing switch decreases the illumination. The illumination response to the switch changes may not be instantaneous. Lower control system sampling frequency may increase the response time.

Both prototypes had an MCU Power Conditioner for processing and filtering the driver voltage and/or the battery voltage to provide the VDD voltage. The MCU Power Conditioner had one or two connections (1 or 2 diodes) for channeling power to the MCU. A Driver Voltage Diode CR1 tapped the driver voltage (or LED voltage), and a Vcc Diode CR2 tapped the Vcc voltage, which comprised the battery voltage Vbatt and/or the solar voltage Vp.

Remarkably, the operational LED voltage range of the selected LED was within a range of power supply voltages required by the MCU. The MCU needed an MCU power supply voltage VDD between 1.8 volts and 5 volts. The LED voltage was about 2 to 3.3 volts. This well-managed matchup helped support the low-cost objective by eliminating a voltage regulator.

In normal operation of the first prototype, the driver voltage was greater, so it reversed-biased the Vcc diode permitting only the driver voltage to power the MCU. But if the battery was removed, the prototype entered an abnormal operating mode in which the driver voltage diode was reversed biased when the solar panel's solar voltage was greater than the driver voltage. This created a condition in which only the solar panel alone powered the MCU. In normal operation of the second prototype, the battery voltage was about the same as the driver voltage, so only the battery voltage powered the MCU. If the battery was removed, the second prototype may enter an abnormal operating mode in which the Vcc voltage is too high, being greater than any functional voltage of the rechargeable battery. The firmware programs of the prototypes were configured to sense these abnormal operating modes, disable the controller, and/or prevent abnormal operation. It was evident with the rechargeable batteries were removed because the LED flashed, stayed lit, and/or was not lit during daytime and the LED was not lit during nighttime.

In the first prototype, the light unit had a shut-down input terminal (SHDN) for enabling functional control over the variable drive current. In essence, SHDN allowed the controller to manage the illumination by sending illumination commands to the light unit. The controller provided a strobe PWM output signal to rapidly turn-on and turn-off the light driver, affecting the variable drive current. In effect, this can dim the humanly visible illumination because the strobe PWM may be too fast for human perception. The fundamental frequency of the strobe was typically greater than 50 Hz to avoid the illumination fluttering (flashing) in appearance to the human eye. But the fundamental frequency could have been faster or slower, depending on design objectives. If slower, 0 Hz to less than 50 Hz for example, then strobe flashes may have been observable. If faster, 10 KHz, 100 KHz, or more for example, then strobe flashes may not have been observable. In the second prototype, the SHDN was replaced by a gate terminal of the Q3 transistor, which received the strobe signal.

The MCU Power Conditioner included a low-pass filter (comprising C4) for converting the light driver PWM output voltage (the driver voltage carried by the CR1 diode) to the VDD voltage for the controller. One LED was sufficient to provide regulated voltage to power the controller. More LEDs in series were not required but could have been used to increase the VDD voltage. During the day, the strobe had a low duty cycle (less than 15%) to put the light unit into an idle (low power mode). The idle provided dim light emission, or no light emission. In the second prototype, the controller normally drew power from the battery or the solar panel instead of the LED, so the idle in this prototype disabled the light unit during the day.

The idle may be referred to as one class of illumination commands, carried by the strobe from the controller to the light unit. In general, the idle command may be enabled in daytime even though illumination from the light unit is not required. The idle may provide sufficient variable drive current Iled to keep the MCU running if VDD depends on the driver voltage, as shown by the example of the first prototype. Otherwise, the strobe may turn off the light driver during daytime as was implemented by the controller of the second prototype. The controller turned off the light driver during daytime not because insufficient power was available from the battery, but because the light driver could not provide power to the controller. The power conditioner was configured to provide power to the controller from the solar panel and/or the battery instead.

Another class of illumination commands may be referred to as "schedule" or "schedules". This class may be employed mainly for managing the humanly visible illumination during nighttime, but daytime illumination management may be beneficial as well. The MCU may provide one or more illumination schedules to the light unit via the strobe to govern the brightness of the illumination throughout the nighttime hours. The controller may provide a schedule with a unique or characteristic expression of illumination verses time. The schedules may be charted on a graph having a vertical (Y) axis for illumination intensity, and a horizontal (X) axis for time.

For example, without limitation, one illumination command may send an instruction for the strobe to operate above 50 Hz to provide steady illumination. Then follow-up with another instruction to operate below 50 Hz to provide the fluttering appearance. Another illumination command may include instructions to modulate the strobe's pulse width to vary the illumination intensity. These variations may be employed to provide desirable aesthetic lighting effects (such as emulating a flickering flame), or to provide patterns of light flashes to communicate an important message (such as replace a battery), or to optimize the illumination (such as make the LEDs brighter after sunset and dimmer before dawn), or to shut down the controller (by turning off the light unit, if it is configured to receive power from only the light unit).

The methods employed for creating the illumination commands may be governed by design objectives and available memory storage space. For example, without limitation, the controller may have multiple illumination commands stored in the memory, such as the idle and one or more illumination schedules. The illumination commands may include a collection of multiple instructions, stored in the memory, which may be communicated sequentially to the light unit. The memory may have one illumination command and one or more firmware procedures which the controller may modify in response to information received from the I/O connections, to provide other illumination commands. Alternatively, the memory may contain no illumination commands or instructions, instead having only firmware procedures for creating them.

The controller may typically enable only one illumination command at a time which it sends to the light unit via the strobe. Disabled illumination commands are not sent to the light unit. For example, without limitation, the idle may be enabled only during daytime. One schedule at time may be enabled during nighttime. Any illumination instruction, or sequence of instructions, may be included in any illumination command. The idle or the schedule may include instructions to send a message, create a visual effect, optimize an illumination, and/or turn off the light unit. The instructions may be configured and broadcast in any order or sequence which enables the present invention to achieve its intended objective.

-|- -|- -|- -|- -|-

The block diagram of FIG. 1 shows an area of Substantial Shade 102 being created by a Shading Object 101 casting a Shadow 103 of the Sun 100 which envelopes a Solar Converter Unit (SCU) 104. This may represent an example of substantial shade. The SCU 104 may have PV cells configured to charge an Energy Storage Device (ESD) 111, even while exposed to only the ambient light of the substantial shade. The ESD provides an output of converted solar energy which may include a solar current Ip and/or a solar voltage Vp. The SCU 104 may be coupled to provide the Ip current to a Power Buss 108 via an SCU Power Connection 120. To allow the Ip current to be managed or altered, the Connection 120 may include an SCU Switch 132, a Diode Bypass Switch 116, and/or an SCU Diode 117.

The Power Buss 108 may be coupled to provide the Ichg current to the ESD 111 via an ESD Power Connection 112. An ESD Sensor 113 may be configured to provide a current-sensing input signal to a Controller (MCU) 110. The ESD Sensor 113 may be coupled to exchange information with the MCU 110 via an ESD Sensor Data Connection 125 and/or a Data Buss 109. This exchange of information may enable the ESD Sensor 113 to send information to the MCU 110 regarding the Ichg and Idis current and/or it may enable the MCU 110 to send configuration information to the ESD Sensor 113 if both are configured to facilitate such information. The information about Ichg may include a Signal Responsive to Ichg 136. The information about Idis may include a Signal Responsive to Idis 137. The Data Connection 125 may include an Analog Filter (AF) 119, and/or other devices, to process a Current-Sensing Input Signal 139 for the MCU 110. One example of such processing, without limitation, may decrease ripples caused by PWMs described above. The AF 119 may include a low-pass filter to decrease the ripples, improving quality of feedback signals providing input to the MCU 110.

The ESD Sensor 113 and the MCU 110 may be configured to be non-responsive to any current, voltage, and/or power from the ESD 111 consumed by the MCU 110. This can be achieved because the controller's power consumption may be insignificant relative to the light unit's power consumption. Any portion of the Signal Responsive to Idis 137 attributed to the controller's power consumption may be overwhelmed by noise from the sensor and/or the ADC. But if not overwhelmed by noise, the firmware may be configured to subtract the signal portion attributed to the controller's power consumption to ensure that monitoring power consumed by the controller is impossible.

The ESD Power Connection 112 may also carry the Idis current of the ESD 111 to the Power Buss 108, which may combine Idis with Ip (when available) to provide an Electrical Energy Current Iee 134 for a Light Unit (LU) 105. The Tee current may include the Idis current and/or the Ip current. The LU 105 may include a Light Driver 106 configured to convert the Iee 134 into a Variable Drive Current Iled 133 responsive to illumination commands received at a Function Input Terminal 138. The LU 105 may include a Light-Emitting Device 107 coupled to receive the Iled 133 and produce the humanly visible illumination. The illumination commands may be provided by the MCU 110 via the Buss 109. The LU 105 may provide the Light Driver Current Idri 205 being responsive to the Tee current. In some instances, the following one or more of equations may be true, Idis=Tee, Idis=Iled+Idri, Tee=Iled+Idri.

An LU Data Connection 127 may be coupled to exchange information between the LU 105 and the MCU 110 via the Buss 109. This information may include, without limitation, the illumination commands, temperature, luminosity, color, hue, color temperature, messaging, timing, change versus time and/or duration, status, time in service, voltage, current, setup, and/or configuration.

An ESD Data Connection 114 may be coupled to exchange information between the ESD 111 and the MCU 110 via the Buss 109. This information may include, without limitation, temperature, status, time in service, depth of discharge, cycle life, number of charge cycles, number of discharge cycles, voltage, charging current, discharge current, setup, and/or configuration. A Vcc Reducer 140 may be included to decrease, divide, and/or attenuate a Vcc Input Signal 141 provided to the MCU 110 via the Connection 114. In some configurations, this may be required to prevent overflow or clipping within the ADC, AC, and/or other peripheral devices within the MCU 110.

A MCU Programmer Device (PROG) 115 may be temporarily coupled to program the MCU 110 via an MCU Programmer Data Connection 126. The Programmer 115 may enable firmware to be stored in a memory which is accessible to processor of the MCU 110. The Programmer 115 may transfer instructions and/or firmware to the controller which configures the processor and peripheral devices in accordance with operating requirements. The PROG 115 may facilitate software development, debugging, and/or information exchange with the MCU. The PROG 115 may be disconnected after use.

The MCU 110 may have one or more I/O Connections 118 to facilitate communications with the components described herein and/or with external components such as, but not limited to, other busses, sensors, processors, controllers, and/or solar lights. The I/O Connections 118 may include one or more pins of the MCU 110. Pins may be configured for multi-purpose. The I/O Connections 118 may include the ESD Data Connection 114, an SCU Data Connection 121, an SCU Switch Data Connection 123, a Diode Bypass Switch Data Connection 124, the ESD Sensor Data Connection 125, the LU Data Connection 127, and a PS Data Connection 130.

The SCU Data Connection 121 may be coupled to exchange information between the SCU 104 and the MCU 110 via the Buss 109. This information may include, without limitation, temperature, status, cycle life, time in service, amount of energy converted, solar current, solar voltage, setup, and/or configuration.

The Diode Bypass Switch 116 may be coupled to receive controlling information from the MCU 110 via the Diode Bypass Switch Data Connection 124. The Connection 124 may enable the MCU 110 to close and open the Switch 116. When closed, the Switch 116 may bypass currents around the SCU Diode 117 to improve SCU charging efficiency by eliminating a voltage drop of the SCU Diode 117. Closing the Switch 116 during a substantial shade charging condition may increase the Ichg current. Opening the Switch 116 during a low-light condition may prevent discharging the ESD 111 through the SCU 104.

A Photo Sensor 131 may provide an AL Output 135 responsive to ambient light. The Photo Sensor 131 may be coupled to provide the Output 135 and/or other information regarding the Photo Sensor 131 to the MCU via the PS Data Connection 130 and the Data Buss 109. The Connection 130 may carry the information in analog or digital form. The Sensor 131 and the Connection 130 may be deleted if ambient light information is instead provided by an alternative such as, but not limited to, the SCU 104, the ESD 111, and/or the ESD Sensor 113.

The SCU Switch Data Connection 123 may be coupled to exchange information between the SCU Switch 132 and the MCU 110 via the Buss 109. This information may include, without limitation, a current-limiting PWM output, status, time in service, voltage, current, setup, and/or configuration.

An MCU Power Conditioner (COND) 122 may be included to process and filter power for the MCU 110. An MCU Power Connection A 128 may be coupled to convey power from the Power Buss 108 to the COND 122. An MCU Power Connection B 129 may be coupled to convey power from the LU 105 to the Conditioner 122. The COND 122 may be configured to route power continuously from the Buss 108 and/or the LU 105 to ensure uninterrupted operation of the MCU 110.

-|- -|- -|- -|- -|-

Figure 2:
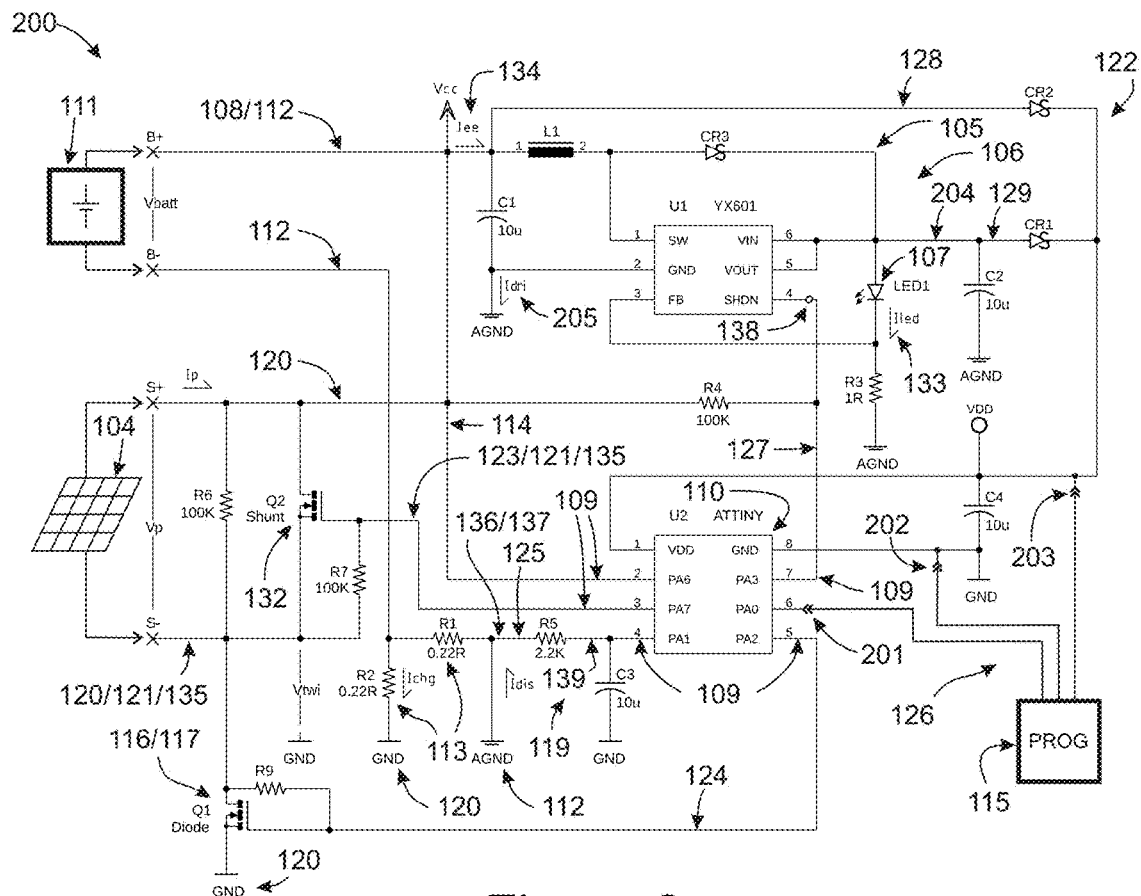
FIG. 2 is a schematic diagram of the present invention implemented as a first prototype.

The schematic of FIG. 2 shows a First Prototype Schematic Diagram 200. It shows the elements 104, 105, 106, 107, 108, 109, 110, 111, 112, 113, 114, 115, 116, 117, 119, 120, 121, 122, 123, 124, 125, 126, 127, 128, 129, 132, 133, 134, 135, 136, 137, 138, and 139 located within the schematic.

A Programming Terminal #1 201, a Programming Terminal #2 202, and a Programming Terminal #3 203 may be utilized to temporarily connect the PROG 115 to the MCU 110. Schematic 200 also shows the location where an Driver Voltage 204 may be measured relative to the MCU Reference Potential (Ground) GND, which is located at pin 8 of an MCU IC Package U2.

An ESD Voltage Vbatt (battery voltage) may exist between a Positive Battery Terminal B+ and a Negative Battery Terminal B−. The rechargeable battery may be connected here. The Solar Voltage Vp may exist between a Positive SCU Terminal S+ and a Negative SCU Terminal S−. The solar panel may be connected there.

A power supply voltage may exist between a Power Supply Voltage Terminal Vcc and the Ground GND. The Vcc voltage may be a voltage of the Power Buss 108. In the normal mode of operation, the rechargeable battery is connected to the B+ and B-terminals, the Vcc voltage may be about the same as the Vbatt voltage, and the Vcc voltage may be governed primarily by the rechargeable battery. In the abnormal mode of operation, the rechargeable battery is disconnected, the Vcc voltage may be about the same as the Vp voltage, and the Vcc voltage may be governed primarily by the solar panel.

An LU Reference Potential (Ground) AGND may exist relative to the GND. The AGND may be a reference potential for the LU 105. The LU 105 may include an LU Inductor L1, an LU Schottky Diode CR3, the LU Sampling Resistor (Rs) R3, an LU Bypass Capacitor C1, an LU Drive Current Filter Capacitor C2, an LU IC Package U1, the Function Input Terminal 138, and a Light Emitting Diode LED1.

Since operation of the LU 105 may be required to power the MCU 110, a Startup Resistor R4 may be included to raise the voltage on the Input 138 when the rechargeable battery is connected. This may ensure the U1 begins operating whether the MCU 110 is operational or not. A bright illumination (or flash) of the LED1 may be evident until the MCU 110 starts operating and issues illumination commands to the LU 105.

The MCU Power Supply Voltage may exist at a Terminal VDD, relative to the GND. The VDD may be provided by the COND 122 which includes the Driver Voltage Diode CR1, the Vcc Diode CR2, and the MCU Power Supply Capacitor C4. In this configuration, the VDD may be provided by either the CR1 or the CR2, depending on the relative values of the Vcc voltage and the Driver Voltage 204. When the Vcc voltage is greater, CR2 may provide the VDD voltage. When the Driver Voltage 204 is greater, the CR1 may provide the VDD voltage. In either instance, the C4 may filter the VDD voltage.

The ESD Sensor 113 includes the Idis Sensing Resistor R1 and the Ichg Sensing Resistor R2. The Idis current may flow into the LU 105 with the Tee current, exiting via the AGND through the R1 charging resistor to provide the Signal Responsive to Idis 137. The Idis may return to the rechargeable battery via the B− and/or it may return to the solar panel via the R2 discharge resistor, the GND, the Q1, and the S−.

When the solar panel produces the solar current Ip, it may flow from the S+ into the Power Buss 108 and splits into the Ichg current and the Tee current. The Ichg may flow into the rechargeable battery via the B+ then into the R2 via the B− to provide the Signal Responsive to Ichg 136. The Ichg may return to the solar panel via the GND, the Q1, and the S−. The Tee may flow into the LU 105 as just described. The signals 136 and 137 may be coupled to the MCU 110 via the PA1 pin and the AF 119, which includes an AF Resistor R5 and an AF Capacitor C3 for the low-pass filter.

Figure 5:
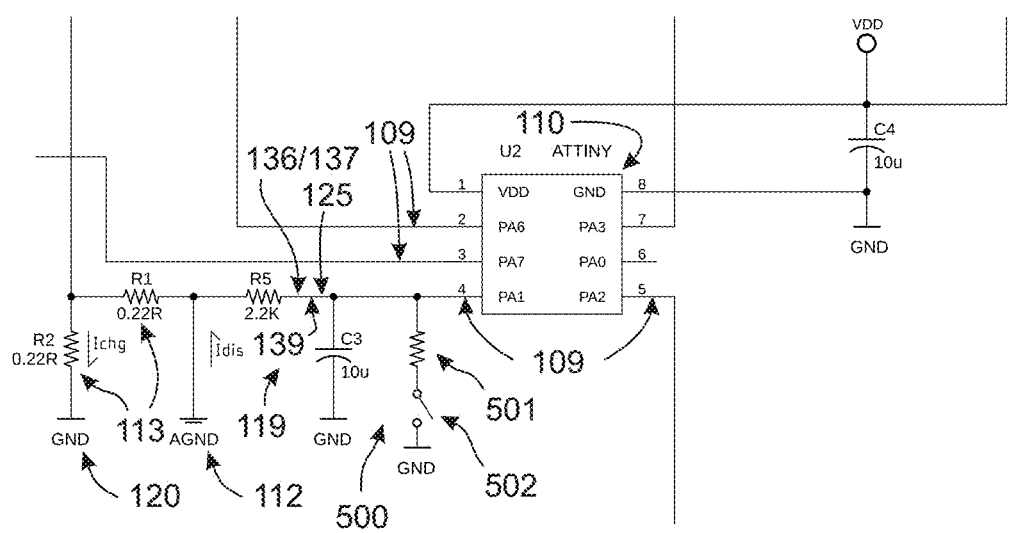
FIG. 5 is a schematic diagram of the present invention for verifying control system operational status.

The Idis voltage divider, described above for verifying the control system operational status, may be included in the AF 119 by adding a Parallel Resistor 501 and a Testing Switch 502 as shown in FIG. 5. The Parallel Resistor 501 and the AF Resistor R5 form an Idis Voltage Divider 500 when the Testing Switch 502 is closed. When the switch is closed, it connects the resistor in parallel with the C3 capacitor and enables the Idis Voltage Divider 500. When the testing switch is opened, it removes the parallel resistor from the AF 119 and disables the Idis Voltage Divider 500. Closing the testing switch increases the Iled current because the Idis Voltage Divider 500 may decrease the Idis feedback signal temporarily while the control system tries to compensate by increasing the Iled current.

Figure 3:
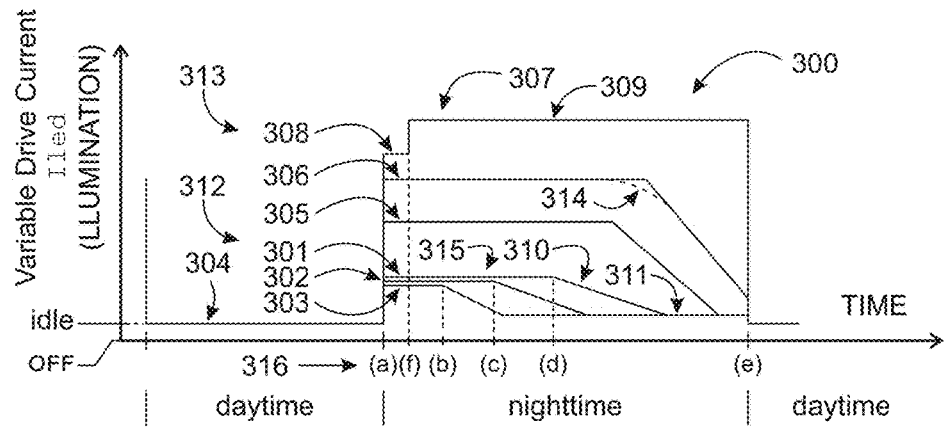
FIG. 3 is a graph showing various illumination commands of the present invention.

Referring to FIG. 3, an alternate embodiment may include of the ESD Sensor 113 having a connection between the resistors R1 and R2 deleted. In this embodiment the Signal Responsive to Ichg 136 may be separated from the Signal Responsive to Idis 137. The ESD Sensor Data Connection 125 may have two or more I/O connections to handle the signals. One pin of the MCU 110 may be coupled to receive the Ichg Signal 136 and another pin may be coupled to receive the Idis Signal 137. These pins may or may not be configured for multi-purpose in accordance with objectives of the alternate embodiment.

The SCU Switch 132 may include a Shunt Switch Transistor (MOSFET) Q2, to divert the Ip current away from the rechargeable battery when the Q2 is turned on. A gate of the Q2 may be coupled to the PA7 pin of the MCU 110 via the Connection 123 for this purpose. When the firmware configures the PA7 pin for multi-purpose, PA7 can also receive the AL Output 135 into the MCU 110 from the solar panel. The AL Output 135 may include an AL Voltage Vtwi, which can be a difference of the Vcc and the Vp voltages. An SCU Pullup Resistor R6 and an AL Resistor R7 may be included to facilitate communication of the Vtwi voltage to the PA7 pin.

The Diode Bypass Switch 116 and the SCU Diode 117 may be configured within a Diode and Switch Transistor (MOSFET) Q1. The Switch 116 may be turned on by the MCU 110 to bypass the Diode 117 when the Vp voltage is present, improving charging efficiency and increasing the Ichg current. The MCU 110 can turn off the Switch 116 when Vp is below a predetermined value, preventing the rechargeable battery form discharging through the solar panel. A gate of the Q1 may be coupled to the PA2 pin of the MCU 110 via the Diode Bypass Switch Data Connection 124 for these purposes. If the PA2 pin is not configured for multi-purpose, an Alternate AL Resistor R9 may be deleted. If the PA2 pin is configured for multi-purpose, the R9 may be included to communicate the Vtwi voltage to the MCU 110 via the PA2 pin. When the PA2 pin is configured for multi-purpose, the PA7 pin may not necessarily be configured for multi-purpose.

-|- -|- -|- -|- -|-

FIG. 3 shows examples of various illumination commands which may be issued by the controller to the light unit, without limitation. The horizontal axis represents advancement of time, with demarcations for periods of daytime and nighttime. The vertical axis represents intensity of the humanly visible illumination, which may be responsive to the variable drive current Iled. Line segments within the graphs are drawn horizontally or vertically, with sharp corners, for illustration. In practical applications, for example without limitation, the segments may be horizontal, vertical, inclined, sloped, stepped, curved, and/or undulated. They may include soft knees as illustrated by a Soft Knee 314.

During daytime, the Iled current of the first prototype provided a Daytime Idle Illumination 304. The LU 105 lit the LED1 dimly, but sufficiently to provide the driver voltage to power the MCU 110 via the CR1. The Iled current of the second prototype during daytime was practically zero, shown as OFF graphically. The LU 105 did not need to create the driver voltage in daytime because power for the MCU 110 of the second prototype was drawn from the rechargeable battery via the CR2.

During nighttime, the MCU may provide Illumination Schedules 300 which may include Shade Illumination Schedules 312 and/or Non-Shade Illumination Schedules 313 to the LU 105. The Shade Illumination Schedules 312 may include a Category 1 Shade Illumination Schedule 301, a Category 2 Shade Illumination Schedule 302, and/or a Category 3 Shade Illumination Schedule 303. The Non-Shade Illumination Schedules 313 may include a Partly Sunny Illumination Schedule 305, a Partly Shady Illumination Schedule 306, and/or a Full Sun Illumination Schedule 307.

The Shade Schedules 301, 302, and 303 may include Periods of Predetermined Illumination 315. These are illustrated by three flat, line segments. A line segment (a)(b) is located between schedule events (a) and (b) for Schedule 303. A line segment (a)(c) is located between schedule events (a) and (c) for Schedule 302. And a line segment (a)(d) is located between schedule events (a) and (d) for Schedule 301. These predetermined illumination periods represented by the line segments, may be separated by small gaps as shown or they may be separated by larger gaps or by no gaps. Having no gaps would make them coincident at least for a while. The predetermined illumination period of the Schedule 301 may be above the other Schedules 302,303 as shown. Or they may be arranged in any order. The predetermined illumination periods may be flat as shown or, for examples without limitation, they may be inclined, curved, sloped, stepped, and/or undulated. They may be parallel and non-intersecting as shown or they may be non-parallel with or without intersecting.

The flatness of the Periods of Predetermined Illumination 315 shown in FIG. 3 may be attributed to the controller maintaining the Iled current at a constant value during each period. Flatness may produce constant illumination independent of the battery voltage. But an alternate embodiment may include the controller maintaining the Idis current at a constant value instead during the predetermined illumination periods, causing the illuminations produced to be more dependent on the battery voltage. The Iled current of this embodiment may be illustrated as not flat in the graph. If flatness is desired with this embodiment, the controller's firmware may be configured to adjust the Idis current in response to changes in the battery voltage. Still, in other embodiments for examples without limitation, the firmware may deliberately cause the Iled current or the Idis current to be inclined, sloped, stepped, curved, and/or undulated to achieve given objectives or to decrease a quantity of instructions stored in the memory and executed by the processor. One skilled in the art may configure the firmware and/or the circuitry in accordance with these objectives.

Any of the illumination commands 301, 302, 303, 304, 305, 306, and 307, may include one or more schedule events as illustrated by a Group of Schedule Events 316. These may include schedule events (a) (b) (c) (d) (e) and/or (f) as shown, without limitation. A first schedule event, as illustrated by the non-limiting example of the schedule event (a), may begin an illumination schedule. The strength of the variable drive current may be configured by the controller in response to sensed parameters such as SoC and/or AL output, without limitation. The first schedule event may command the light unit to drawn energy from the storage device at a rate which may be sustainable throughout nighttime as illustrated by the non-limiting example of the Full Sun Illumination Schedule 307. Alternatively, the first schedule event may command the light unit to drawn energy from the storage device at a faster rate which may be not sustainable throughout nighttime as illustrated by the non-limiting example of the Shade Illumination Schedules 312. The second schedule event, such as the schedule events (b) (c) and (d), may be employed to slow the energy draw. This configuration of events may enable the illumination to be sustained throughout nighttime although with lesser intensity later in nighttime. A benefit of this configuration is better allocation of limited solar energy that can be collected from the substantial shade charging condition. This allocation can provide stronger illumination in early nighttime, when more users may be present or active, weaker illumination later in nighttime, when fewer users may be present or active, and the illumination can be sustained throughout nighttime.

Any of the schedules may include an Illumination Delay 308 which is shown beginning after sunset in the non-limiting example of the Full Sun Illumination Schedule 307. After the delay, the nighttime illumination may be increased, as shown in a non-limiting example by the schedule event (f). The Illumination Delay 308 may include a predetermined time delay configured by the firmware. The Delay 308 may be governed by the firmware of the MCU 110 in response to received information and/or predefined objectives.

Any schedule may include a drop-off of illumination as illustrated by an Illumination Ramp-Down 310. Any schedule may also include a Nighttime Minimum Illumination 311, which may be greater than, lesser than, or equal to the Idle 304. The drop-offs may be initiated by schedule events as illustrated by the Schedule Events (b) (c) or (d). For example, without limitation, the timing of the schedule event, which governs the beginning of the drop-off, may be responsive to an amount of energy stored in the ESD. The Category 1 Schedule 301 may have a longer predetermined illumination period before the drop-off begins. A longer time delay between events (a) and (d) may be attributed to more solar energy being stored during the category 1 shade, relative to the category 2 shade or the category 3 shade. A shorter time delay between events (a) and (b) may be attributed to less solar energy being stored during the category 3 shade.

Any illumination schedule may include an Illumination Plateau 309, which may represent an upper limit of illumination for the schedule. The upper limit may be responsive to an amount of stored solar energy. More stored energy may bring about a higher limit. The plateau of the Full Sun Illumination Schedule 307 may be higher than plateaus of the Partly Shady Illumination Schedule 306 and the Partly Sunny Illumination Schedule 306 as illustrated by the graph. This relationship is preferred because more stored solar energy may be attributed to the full sun charging condition. Although this relationship may be reversed in pursuit of other design objectives.

Any illumination schedule may include one or more schedule events to initiate one or more illumination ramp-downs, inclines, slopes, curves, transitions, undulations, and/or steps which decreases the illumination. Any illumination schedule may include one or more schedule events to initiate one or more illumination ramp-ups, inclines, slopes, curves, transitions, undulations, and/or steps which increase the illumination. Any illumination schedule may include one or more schedule events to initiate one or more illumination ramp-ups, inclines, slopes, curves, transitions, undulations, and/or steps which upon completion leave the illumination neither increased nor decreased.

Within an illumination schedule, any of the illumination plateaus may be followed by a ramp-down, which may have a corresponding schedule event. The illumination schedule may include an uppermost limit of illumination which may not be exceeded regardless of any charging condition. It may also include a lowermost limit of illumination which defines a minimum illumination objective and may be represented by the Nighttime Minimum Illumination 311. The illumination schedule may be bounded within a predetermined range defined by these uppermost and lowermost limits.

The illumination commands are shown with certain illumination transitions corresponding to the schedule events (a) and (e) at twilight. The transitions are illustrated by vertical lines drawn at boundaries between daytime and nighttime. The boundaries and transitions may or may not occur precisely at twilight. The controller and its firmware may be configured to advance and/or delay the schedule events (a) and (e). An advanced transition may occur before twilight. A delayed transition may occur after twilight. The transition also may include variations. Without limitation, a variation may change a vertical line of a transition to inclined, sloped, stepped, curved, and/or undulated. A variation may increase an amount of time required to complete a transition. It may be longer than twilight. A portion of a transition may be advanced and another portion of it may be delayed.

-|- -|- -|- -|- -|-

Figure 4:
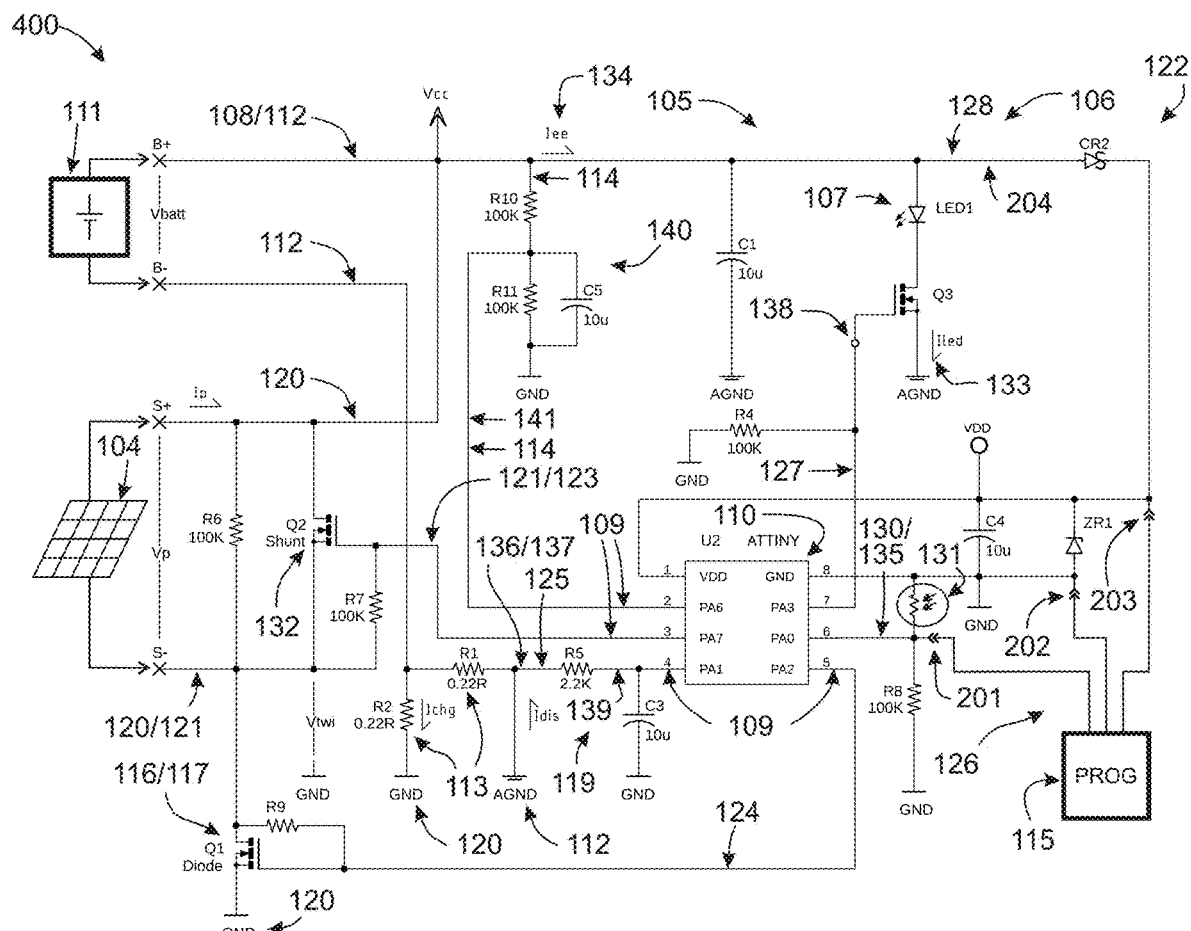
FIG. 4 is a schematic diagram of the present invention implemented as a second prototype.

The schematic of FIG. 4 shows a Second Prototype Schematic Diagram 400. It shows the elements 104, 105, 106, 107, 108, 109, 110, 111, 112, 113, 114, 115, 116, 117, 119, 120, 121, 122, 123, 124, 125, 126, 127, 128, 130, 131, 132, 133, 134, 135, 136, 137, 138, 139, 140, 141, 201, 202, 203, and 204 located within the schematic. It also shows elements Vbatt, B+, B−, Vcc, GND, AGND, Vp, VDD, S+, S−, R1, R2, R5, R6, R7, R9, C1, C3, C4, CR2, Q1, Q2, LED1, U2, and Vtwi located within the schematic.

The elements U1, L1, C2, and R3 are not included because the rechargeable battery has a nominal voltage which is greater than the LED voltage. This removes any requirement on the LU 105 of FIG. 4 to have a voltage converter or provide voltage conversion to drive the LED1 into forward conduction. The R4 is connected to GND instead of the Vcc voltage because the LU 105 is not required to power the MCU 110. The nominal battery voltage may be sufficient to forward bias the CR2 and power the MCU 110. The Startup Resistor R4 may prevent the LU 105 from entering an unknown state. The R4 may disable the LU 105 while the MCU 110 is starting operation or powering up. The CR1 and the Connection 129 are not included because the Vcc voltage and the Driver Voltage 204 may be practically the same.

The Photo Sensor 131 may provide the AL Output 135 to the MCU 110 via the PS Data Connection 130, which shares the PA0 pin with the PROG 115. An AL Resistor R8 is included to facilitate the Photo Sensor 131 operation.

The Vcc Reducer 140 is included because the VDD voltage powering the MCU 110 may not be greater than the Vcc voltage being measured by the MCU 110. The reduction provided can improve accuracy of measurements done by the MCU 110 on the Vcc Input Signal 141. The firmware can be configured to compensate for the reduction when processing the Vcc Input Signal 141. For a voltage divider including the resistors R10 and R11, the reduction may be equal to the following equation, ATTENUATION=R11/(R10+R11), where ATTENUATION is the reduction, R10 is the value of a Vcc Divisor Resistor R10, and R11 is the value of a Vcc Numerator Resistor R11. An optional Vcc Input Signal Filter Capacitor C5 may be included to reduce noise in Vcc measurements. It should be noted that other kinds of reducers may be utilized. The Vcc Reducer 140 may include or be replaced by a lever shifter. For example, without limitation, the level shifter may have the R10 resistor replaced by a diode or a transistor to provide a voltage drop, and/or the R11 resistor may be connected to a negative voltage. The firmware may be configured to process for the information provided by the kind of reducer utilized.

A Zener Diode ZR1 is included to protect the MCU 110 from excessive voltage. When the rechargeable battery is removed, and the solar panel is exposed to bright light, the solar voltage Vp may be greater than an absolute maximum value specified by the MCU manufacturer. The ZR1 diode may decrease the VDD voltage to prevent failure of the controller in this instance.

-|- -|- -|- -|- -|-

In another embodiment of the invention, the idle may be provided by the light unit instead of the controller. The light unit may include a minimum value for the variable drive current. When the controller turns off the strobe PWM (0% duty cycle), the light unit may continue to provide sufficient LED voltage to power the controller.

A total amount of charge stored in the energy storage device may be represented by Cchg having units of mAh. Chg may be converted to an approximation of total stored energy utilizing the equation, En=Cchg×Vn/1000. En may have units of watt-hours. Vn may represent the nominal voltage of the energy storage device. For an example of a rechargeable battery, without limitation, Cchg may be an average of the Ichg current in mA, multiplied by the recharging time in hours, multiplied by a battery efficiency factor which may be less than 1. An estimate of energy added to the rechargeable battery during a given period may be approximated by an equation, deltaEchg=deltaCchg×Vn/1000. deltaEchg may have units of watt-hours. deltaCchg may be an average of the Ichg current in mA, multiplied by the given period in hours, divided by the device efficiency.

The teaching of the present invention may be applied to various solar powered lights such as, but not limited to, walkway light, motion activated light, spot light, flood light, landscape light, waterproof light, deck light, dock light, lamp-post light, security light, post-cap light, pillar light, fence light, post-mount light, flag light, string of lights, rope light, planter light, wall light, path marker light, planter, patio, lantern, Chinese lantern light, color-changing light, Christmas lights, Halloween light, fairy light, waterproof light, barn light, camping light, marker light, street light, safety light, overhead light, arbor light, outdoor floor lamp light, free standing light, etc.

The features disclosed in this specification may be replaced by alternative features serving the same, equivalent, or similar purpose, unless stated otherwise. This includes the accompanying abstracts and drawings. Unless stated otherwise, each feature disclosed is an example one generic series of equivalent or similar features.

Having fully described several embodiments of the present invention, other equivalent or alternative methods of implementing controlled illumination with substantial shade charging conditions in accordance with the present invention will be apparent to those skilled in the art. Various aspects of the invention are described with illustrations. The embodiments disclosed are not intended to limit the invention to the forms disclosed. The implementations of the components may vary depending upon context or application.

By examples, and not limitation, the electrodes and holders described in the foregoing were principally directed to resistance welding implementations. Similar practices may instead be applied to other welding systems where decreased maintenance downtime is desirable, which implementations are contemplated as within the scope of the present invention. The invention is to cover modifications, equivalents, and alternatives falling within the spirit and scope of the following claims. It is to be further understood that not all the disclosed embodiments in the foregoing specification will necessarily satisfy or achieve each of the objects, advantages, or improvements described in the foregoing specification.

The description of the present invention is not intended to be exhaustive or limited to the invention in the forms disclosed. Many modifications and variations will be apparent to those of ordinary skill in the art without departing from the scope and spirit of the invention. The embodiments were chosen and described to explain the principles of operation and practical application, and to enable others of ordinary skill in the art to understand the invention for various embodiments with various modifications as are suited to the contemplated use.

Claim elements and steps herein may have been numbered and/or lettered solely to assist readability and understanding. The numbering and lettering is not intended to and should not be taken to indicate an ordering of elements and/or steps in the claims.

The Abstract is provided to comply with 37 C.F.R. Section 1.72(b) requiring an abstract that will allow the reader to ascertain the nature the disclosure. It is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. An apparatus, comprising:
   (a) a controller and a light unit being configured for at least providing a humanly visible illumination;
   (b) a solar converter unit and an energy storage device being configured for at least supplying an energy output for the light unit to provide the humanly visible illumination, the solar converter unit being configured for at least charging the energy storage device during a substantial shade charging condition; and
   (c) the controller, comprising:
      (i) a processor being coupled to at least adjust the humanly visible illumination,
      (ii) a memory accessible to the processor, and
      (iii) a program stored in the memory for execution by the processor, to at least provide a change in the humanly visible illumination from a first status being greater than OFF to a second status being greater than OFF.

2. The apparatus of claim 1 further comprising:
   (a) the light unit including at least one light-emitting device;
   (b) a variable drive current flowing through the at least one light-emitting device;
   (c) the at least one light-emitting device providing a forward conduction voltage responsive to the variable drive current; and
   (d) the controller being powered by at least the forward conduction voltage.

3. The apparatus of claim 1 wherein the controller is further configured for sensing at least the substantial shade charging condition and providing a shade illumination schedule in response to at least the substantial shade charging condition.

4. The apparatus of claim 3 wherein the controller is further configured for sensing at least a standard charging condition and providing a non-shade illumination schedule in response to at least the standard charging condition.

5. The apparatus of claim 3 further comprising:
   (a) an I/O connection being configured for at least providing to the controller, information regarding a state-of-charge of the energy storage device; and
   (b) the controller receiving the communication and configuring the shade illumination schedule responsive to the information provided to the controller.

6. The apparatus of claim 1 wherein the change in the humanly visible illumination includes at least one adjustment selected from the group consisting of luminosity, color, hue, color temperature, and messaging.

7. An apparatus, comprising:
   (a) a light unit being configure for at least processing an energy output of at least an energy storage device to provide a humanly visible illumination being responsive to at least one illumination command;
   (b) a solar converter unit being configured for at least charging the energy storage device during a substantial shade charging condition; and
   (c) a controller, comprising:
      (i) a processor being coupled to respond to at least the substantial shade charging condition,
      (ii) a memory accessible to the processor, and
      (iii) a program stored in the memory for execution by the processor, for providing the at least one illumination command in response to at least the substantial shade charging condition.

8. The apparatus of claim 7 wherein the at least one illumination command comprises a shade illumination schedule having a period of predetermined illumination.

9. The apparatus of claim 8 wherein the processor is further coupled to at least respond to the energy storage device, and the shade illumination schedule includes a schedule event being configured to at least decrease the humanly visible illumination.

10. The apparatus of claim 9 wherein the schedule event is responsive to at least a voltage of the energy storage device falling below a predetermined threshold.

11. The apparatus of claim 8 further comprising the controller being coupled to respond to an ambient-light sensor for enabling the controller to at least identify a daytime.

12. The apparatus of claim 10 further comprising:
   (a) the at least one illumination command including an idle being configured for at least enabling the controller to receive sufficient voltage for operation during the daytime; and
   (b) the controller being further configured to at least enable the idle in response to the controller identifying the daytime.

13. An apparatus, comprising:
   a solar light, comprising:
   (a) a light unit being configured for at least receiving power from an energy storage device to provide a humanly visible illumination responsive to a function input terminal, and
   (b) a solar converter unit being configured for at least charging the energy storage device; and
   a controller having an IC package, comprising:

(i) 6 or less pins being configured for a plurality of I/O connections, having at least one I/O connection coupled to the function input terminal, (ii) a memory accessible to a processor, and (iii) a program stored in the memory for execution by the processor, for at least enabling the controller to manage the humanly visible illumination.

14. The apparatus of claim 13 wherein:

(a) the solar converter unit is further configured for at least charging the energy storage device during a substantial shade charging condition; and (b) the 6 or less pins include at least one multi-purpose pin.

15. The apparatus of claim 14 further comprising a switch being coupled to at least enable the controller to open and close the switch via the at least one multi-purpose pin.

16. The apparatus of claim 15 further comprising the controller being coupled to at least receive a current-sensing input signal via the at least one multi-purpose pin.

17. An apparatus, comprising:

(a) a light unit and a controller being configured for at least providing a controlled illumination;

(b) a solar converter unit and an energy storage device being configured for at least supplying energy for the light unit to provide the controlled illumination, the solar converter unit being configured for at least charging the energy storage device during a charging condition; and (c) the controller, comprising:

(i) a processor being coupled to at least respond to the charging condition and manage the controlled illumination, (ii) a memory accessible to the processor, and (iii) a program stored in the memory for execution by the processor, for providing at least a shade illumination schedule in response to the charging condition comprising a substantial shade charging condition.

18. The apparatus of claim 17 wherein the controller is further configured to at least enable a non-shade illumination schedule in response to the charging condition comprising a standard charging condition.

19. The apparatus of claim 18 further comprising the substantial shade charging condition being longer than the standard charging condition, and the controller responding by at least disabling the non-shade illumination schedule.

20. The apparatus of claim 17 wherein the shade illumination schedule comprises a period of predetermined illumination followed by a schedule event being configured for at least decreasing the controlled illumination.

\* \* \* \* \*